US006007181A

United States Patent [19]

Takahashi et al.

[11] Patent Number: 6,007,181

[45] Date of Patent: Dec. 28, 1999

[54] INK-JET PRINTING APPARATUS AND INK-JET PRINTING METHOD FOR REDUCING DENSITY UNEVENNESS IN A PRINTED IMAGE DUE TO DEVIATION OF INK APPLICATION POSITION

[75] Inventors: Kiichiro Takahashi, Kawasaki; Naoji Otsuka; Kentaro Yano, both of Yokohama; Hitoshi Nishikori, Inagi; Osamu Iwasaki, Tokyo; Daigoro Kanematsu, Kawasaki, all of Japan

[73] Assignee: Canon Kabushiki Kaisha, Tokyo, Japan

[21] Appl. No.: 08/959,194

[22] Filed: Oct. 28, 1997

[30] Foreign Application Priority Data

| | | | |
|---|---|---|---|
| Oct. 30, 1996 | [JP] | Japan | 8-288278 |
| Oct. 23, 1997 | [JP] | Japan | 9-291182 |

[51] Int. Cl.[6] .......... B41J 29/38

[52] U.S. Cl. .......... 347/41

[58] Field of Search .......... 347/40, 43, 41

[56] References Cited

U.S. PATENT DOCUMENTS

| | | | |
|---|---|---|---|
| 5,500,662 | 3/1996 | Watanabe | 347/41 |
| 5,604,520 | 2/1997 | Matsubara et al. . | |
| 5,625,391 | 4/1997 | Hirabayashi et al. | 347/43 |
| 5,654,744 | 8/1997 | Nicoloff et al. | 347/43 |
| 5,684,517 | 11/1997 | Clemente et al. | 347/43 |
| 5,754,198 | 5/1998 | Nishikawa | 347/43 |
| 5,777,640 | 7/1998 | Shioya et al. | 347/41 |
| 5,844,585 | 12/1998 | Kurashima et al. | 347/43 |

FOREIGN PATENT DOCUMENTS

| | | |
|---|---|---|
| 0517521 | 12/1992 | European Pat. Off. . |
| 0566318 | 10/1993 | European Pat. Off. . |
| 0679518 | 11/1995 | European Pat. Off. . |
| 0730973 | 9/1996 | European Pat. Off. . |

*Primary Examiner*—N. Le
*Assistant Examiner*—Lamson D. Nguyen
*Attorney, Agent, or Firm*—Fitzpatrick, Cella, Harper & Scinto

[57] ABSTRACT

In a multi-scan method for printing a printing area by n (4) scans of a head and printing individual scan lines with n different ejection ports, a paper feed amount of transporting performed between the individual n scans is set to a value less than an amount of {(a length of total ejection port)/(n−1)}, and thereby close ejection ports in the ejection port arrangement in the head can be used as the n ejection ports for the individual lines, and an application position deviation between the ejection ports for individual lines due to a head mount error or the like can be reduced. As a result, unevenness of density due to deviation of dots in a scanning direction can be suppressed.

14 Claims, 22 Drawing Sheets

START
PRINTING DATA RETRIEVAL (S1)
SETTING OF (NUMBER OF EJECTION PORTS x EJECTION PORT PITCH):A (S2)
SETTING OF NUMBER OF SCANS:n (S3)
PAPER FEED IN THE SAME AREA ? (S4) YES / NO
SETTING OF FEED AMOUNT: $f_k$ $f_k<A/2(n-1)$ (S5)
SETTING OF FEED AMOUNT: $f_n$ $f_n=A-f_k\cdot 2(n-1)$ (S6)
PAPER FEED OF $f_k$ (S7)
PAPER FEED OF $f_n$ (S8)
PRINTING (S9)
PRINTING DATA PRESENT ? (S10) YES / NO
END

INK-JET PRINTING APPARATUS AND INK-JET PRINTING METHOD FOR REDUCING DENSITY UNEVENNESS IN A PRINTED IMAGE DUE TO DEVIATION OF INK APPLICATION POSITION

This application is based on applications Nos. 288,278/1996 filed Oct. 30, 291,182/1997 filed Oct. 23, 1997 in Japan, the content of which is incorporated hereinto by reference.

BACKGROUND OF THE INVENTION

1. Field of the Invention

The present invention relates to an ink jet printing apparatus and ink jet printing method, more specifically to a structure for high quality printing and high-speed printing.

2. Description of the Prior Art

Recently, machines used in an office such as personal computers, word processors and the like are being widely used, and various printing apparatus for printing information processed by these machines are provided. High image quality and high-speed printing technologies for such apparatus are being rapidly developed.

(1) Image quality improving technology

As an example of image quality improving technology, a so-called multi-scanning method is known.

When printing using a printing head having a plurality of printing elements such as ink ejection ports and the like, quality of a printed image depends very much on properties of the printing head itself. For example, minute differences generated in a production process of the printing head, such as a difference between shapes of respective ejection ports forming the printing elements of the printing head and deviation of a mounting position of an electro-thermal converter (ejection heater), individually affect an ejection amount of an ink and an ejection direction of the ink, resulting in degraded image quality as unevenness of density in a printed image.

A practical example thereof will be described with reference to FIG. 1 and FIG. 2. In FIG. 1A, a reference numeral 101 denotes the printing head, which is schematically shown and for simplicity, assumed as having eight ink ejection ports 102. A reference numeral 103 individually indicates an ink droplet ejected from the ejection port 102, which is assumed to be normally ejected in about the same ejection amount and in the same direction, as shown in the Figure. By such ejecting, a dot of approximately the same size is formed on a paper as shown in FIG. 1B, thereby obtaining a uniform image without the unevenness of density in the printed image as a whole (see FIG. 1C).

However, in practice, as described above, the individual ejection ports of the printing head often have deviations in ejection characteristics such as the ejection amount or the like. Therefore, when ejecting the ink without taking any measures, as shown in FIG. 2A, deviations are generated in sizes and directions of ink droplets ejected from the individual ejection ports. Then, dots formed on the paper differ in positions and sizes as shown in FIG. 2B. As a result of this, for example, unprinted white portions extending in a main scanning direction of the head may be periodically generated, in which portions dots are not formed to satisfy an area factor of 100%, or on the contrary, dots may be excessively overlapped, or a white stripe may be generated as seen at a center of the FIG. 2B. An image formed with aggregates of dots of such a state have a concentration distribution as shown in FIG. 2C in an ejection port arrangement direction, resulting in the unevenness of density that can be perceived by human eyes.

Then, the following method is known as a measure for such an unevenness of density. This method will be described with reference to FIG. 3 and FIG. 4.

According to the method, as shown in FIG. 3, the head 201 is scanned three times to accomplish a printed area shown in FIG. 1 or FIG. 2, a half of which, the area of four pixels, is accomplished by two scans (hereinafter referred to as "two passes"). In this case, eight ink ejection ports 202 of the head 201 are divided into two groups of upper four ejection ports and lower four ejection ports, and a number of dots formed of the inks ejected from a single ejection port in a single scan is thinned to about a half in the main scanning direction arrangement of dots. The remaining half dots are complementarily formed in the second scan to accomplish printing of the area of four pixels. Hereinafter referred to as the multi-scanning method.

Since, with this printing method, affection on the printing area inherent to each ejection port is reduced to a half even if the same head as shown in FIG. 2 is used, the printed image as shown in FIG. 3B can be obtained, in which black stripes or white stripes as seen in FIG. 2B are not noted. Therefore, as shown in FIG. 3C, the unevenness of density is also relatively well reduced as compared with the case shown in FIG. 2.

When performing such printing, with respect to the first and second scans, image data is divided according to a predetermined arrangement so that the image data for respective first and second scans complement each other. In most cases, the arrangement (thinning pattern) of the image data is formed just like in a checkered pattern at every pixel in horizontal and vertical directions, as shown in FIG. 4. In a unit printing area (in this case, the area of four pixels), a checkered pattern is printed in the first scan (FIG. 4A or 4C), and an inverse checkered pattern is printed in the second scan (FIG. 4B). Thus printing for the unit area is completed.

Further, normally, a constant amount of transporting a printing medium is set for respective transportations performed between respective two scans. In examples shown in FIG. 3 and FIG. 4, the printing medium is transported at an amount of 4 ejection port pitches.

(2) High-speed printing technology

As an example of high-speed printing technology, a construction with increased number of ejection ports of the printing head may be considered. In the case of serial printing in which printing is performed in one scan using all of the ejection ports of the printing head, although there is not a strict proportional relationship because of time required for supplying and discharging the printing medium or the like, a printing speed increases with increase of a number of ejection ports used for printing. For example, when using the printing head having 64 ejection ports at an arrangement density of 360 dpi, printing on an A4-size printing medium can be achieved in about 60 printing scans, whereas with a printing head having 256 ejection ports at the same arrangement density, printing is achieved in about 15 printing scans. The printing speed is increased as a whole to nearly about 4 times the former speed.

In this case, however, while the former head has an ejection port arrangement length of about 4.5 mm (=25.4 mm/360 dpi×63 ejection port pitches), the latter head has a port arrangement length of about 18 mm (=25.4 mm/360 dpi×255 ejection port pitches), which is about four times the former length. In principle, an accuracy of application position of printing dot is not changed depending upon the ejection port arrangement length. However, in an actual apparatus, an accuracy in fabrication process must be considered for mass production. For example, as shown in FIG. 5, a deviation may be generated due to a tolerance in a mounting angle of the printing head. For example, when the printing head mounting angle is slanted by 0.3° with respect to a column direction on the image as a reference, the printing head having 64 ejection ports has a maximum deviation of about 23 μm (=1.5 mm×sin 0.30°), whereas the printing head having 256 ejection ports has a maximum deviation of about 94 μm (=18 mm×sin 0.30°). In the image having pixel density of 360 dpi, a pixel pitch is about 70 μm. In this case, the above deviation is not a problem in a printing head of 64 ports. However, in a printing head of 256 ports, the deviation is greater than 1 pixel pitch, which is a fatal problem.

Further, when the printing head itself is curved as shown in FIG. 6, or similarly when the ejection direction of the ink is deflected, deviation of application position becomes conspicuous depending on the ejection port arrangement length which may be a major defect in the image.

In the case where deviation of application position due to the ejection port arrangement length is conspicuous, when printing by the above-described multi-scan method in order to eliminate the unevenness of density, a raster of the image is formed by different ejection ports. With respect to these ejection ports, the above-described deviation of application position in FIGS. 5 and 6 is a regular one shown in accordance with positions of the ejection ports used for printing the raster of the of image. Therefore, influence of such a deviation is less reduced by the multi-scan method and the deviation of application position is not eliminated, and a texture (pattern) is generated due to the deviation.

That is, in the prior art multi-scan method, a sufficient effect can be obtained for preventing unevenness of density due to the deviations in ejection characteristics of ejection ports. However, when an increased number of ejection ports are used for high-speed printing, the texture may be generated due to the deviation of application position caused by the ejection port arrangement length in the printing head.

SUMMARY OF THE INVENTION

An object of the present invention is to provide an ink jet printing apparatus and ink jet printing method which enables multi-scan printing with suppressed generation of texture due to deviation of application position of the printing head.

Another object of the present invention is to provide an ink jet printing apparatus and ink jet printing method in which, when printing an area of a predetermined size by scanning a printing head n times and feeding a paper at a feeding amount of $f_k$ (k being an integer which satisfies an equation $1 \leqq k \leqq n-1$) between each successive two scans in n times of scans (n being an integer of 2 or more), $f_k$ is set smaller than at least $A/(n-1)$ (A being obtained as a product of a number of ejection ports multiplied by a ejection port pitch) so that closer ejection ports in the ejection port arrangement are used for printing a line, thereby reducing positional deviation between ejection ports for forming the line caused by a fabrication accuracy of printing head and errors in mounting angle of the printing head or the like.

In a first aspect of the present invention, there is provided an ink-jet printing apparatus constructed to use a printing head arranging a plurality of ejection ports for ejecting an ink to a printing medium to perform printing, comprising:

scanning means for scanning the printing head for printing in a scanning direction;

paper feed means for feeding the printing medium relative to the printing head in a feeding direction different from the scanning direction; and print control means for controlling the scanning means and the paper feed means to perform printing for a scan line by performing a plurality of times of scanning to make different ejection ports complementarily correspond to the scan line, in which n (n being an integer of 2 or more) times of scanning of the printing head and (n−1) times of feeding of the printing medium each of which is performed between respective the n times of scanning are performed to perform printing for an area of a size corresponding to a predetermined number of the scan lines, and n-th feeding of the printing medium for performing printing of another area is performed;

wherein a feed amount $f_k$ of each of the (n−1) times of feeding satisfies a following expression;

$$f_k < A/(n-1),$$

where k is an integer satisfying an expression; $1 \leqq k \leqq n-1$, and A is obtained by multiplying a number of the plurality of ejection ports by ejection port pitch.

Here, the $f_k$ may satisfy an expression; $f_k < A/2(n-1)$.

In a second aspect of the present invention, there is provided an ink-jet printing method using a printing head arranging a plurality of ejection ports for ejecting an ink to a printing medium to perform printing, in which printing for a scan line is performed by performing a plurality of times of scanning to make different ejection ports complimentarily correspond to the scan line, the method comprising the steps of:

performing n (n being an integer of 2 or more) times of scanning of the printing head; and performing (n−1) times of feeding of the printing medium each of which is performed between respective the n times of scannings;

performing printing for an area of a size corresponding to a predetermined number of the lines together with the step for n times of scanning and the step for (n−1) times of feeding; and performing n-th feeding of the printing medium for performing printing of another area, wherein a feed amount $f_k$ of each of the (n−1) times of feeding satisfies a following expression;

$$f_k < A/(n-1),$$

where k is an integer satisfying an expression; $1 \leqq k \leqq n-1$, and A is obtained by multiplying a number of the plurality of ejection ports by an ejection port pitch.

Here, the $f_k$ may satisfy an expression; $f_k < A/2(n-1)$.

BRIEF DESCRIPTION OF THE DRAWINGS

FIG. 5 is a schematic view for explaining a case of printing with a slanted printing head due to a printing head mounting error and the like;

DESCRIPTION OF THE PREFERRED EMBODIMENTS

Embodiments of the present invention will be described in detail with reference to the drawings.

FIGS. 7 to 12 are schematic views for explaining the relationship among a preferred ink jet unit IJU, an ink jet head IJH, an ink tank IT, an ink jet cartridge IJC, an ink jet printing apparatus main unit IJRA, and a carriage HC which are according to or applied with the present invention. The individual components will be described below with reference to the drawings.

(i) Brief description of the apparatus main unit

Figures 1A, 1B, 1C:
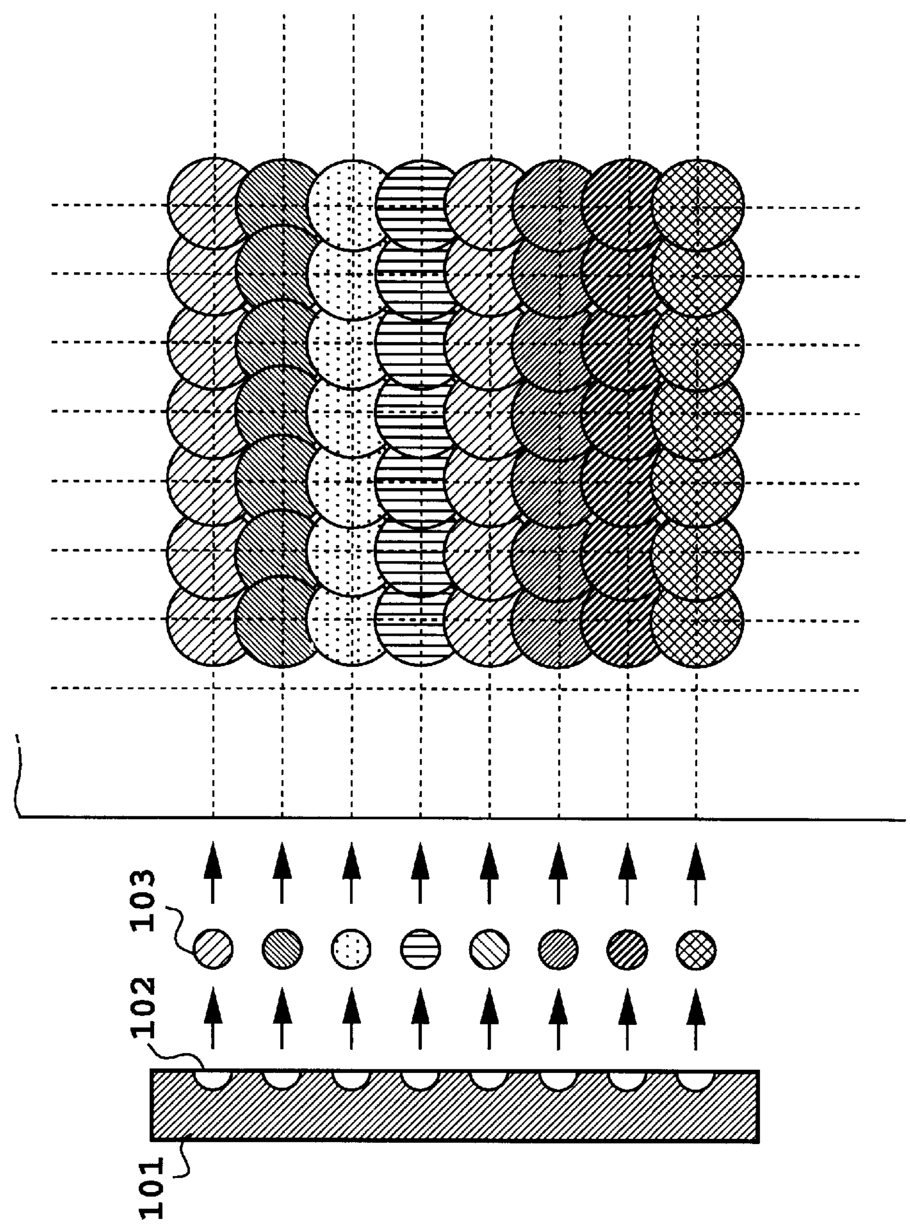
FIGS. 1A, 1B and 1C are schematic views showing an ideal printing state in an ink jet printing apparatus.
Figures 2A, 2B, 2C:
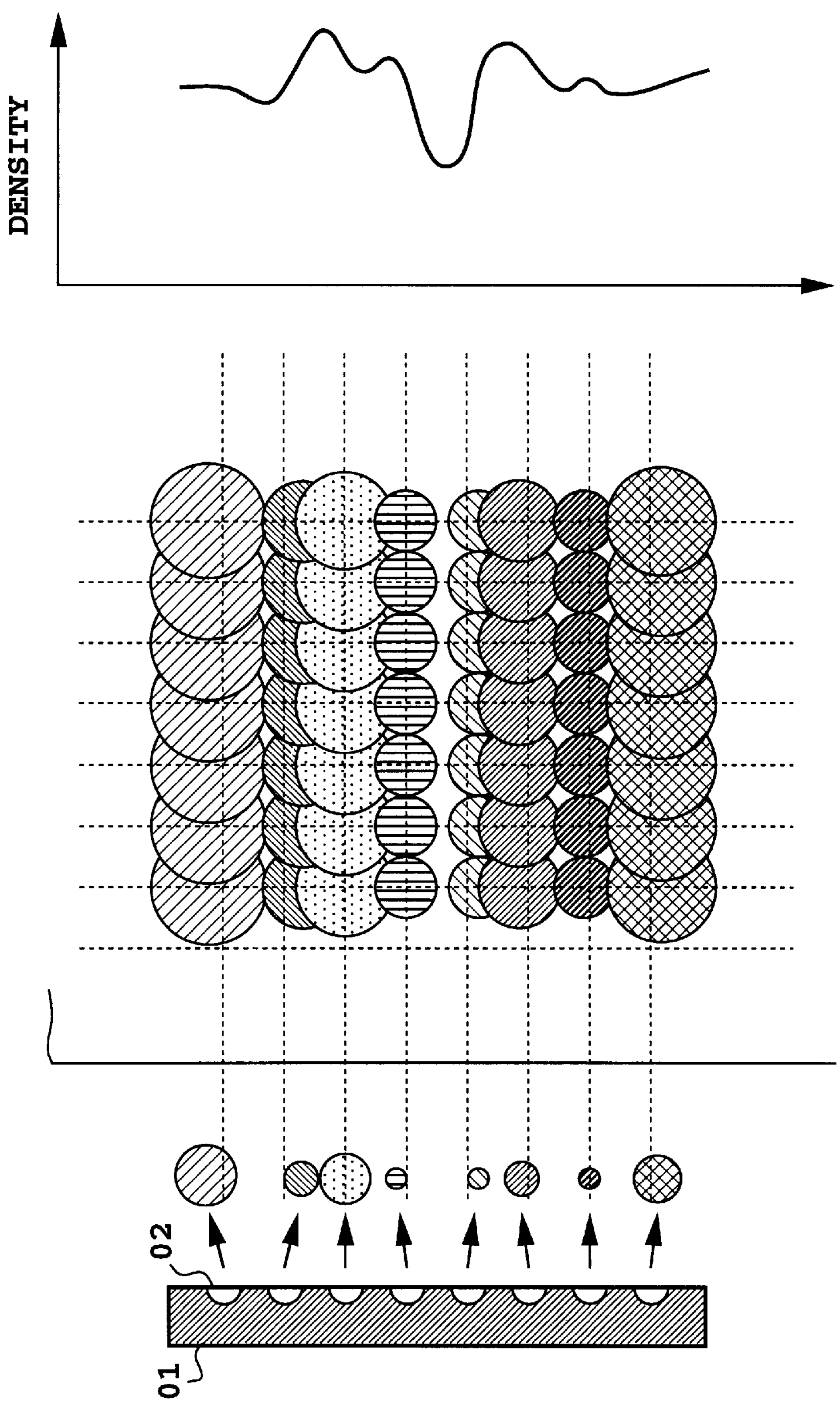
FIGS. 2A, 2B and 2C are schematic views showing printing state with unevenness of density.
Figures 3A, 3B, 3C:
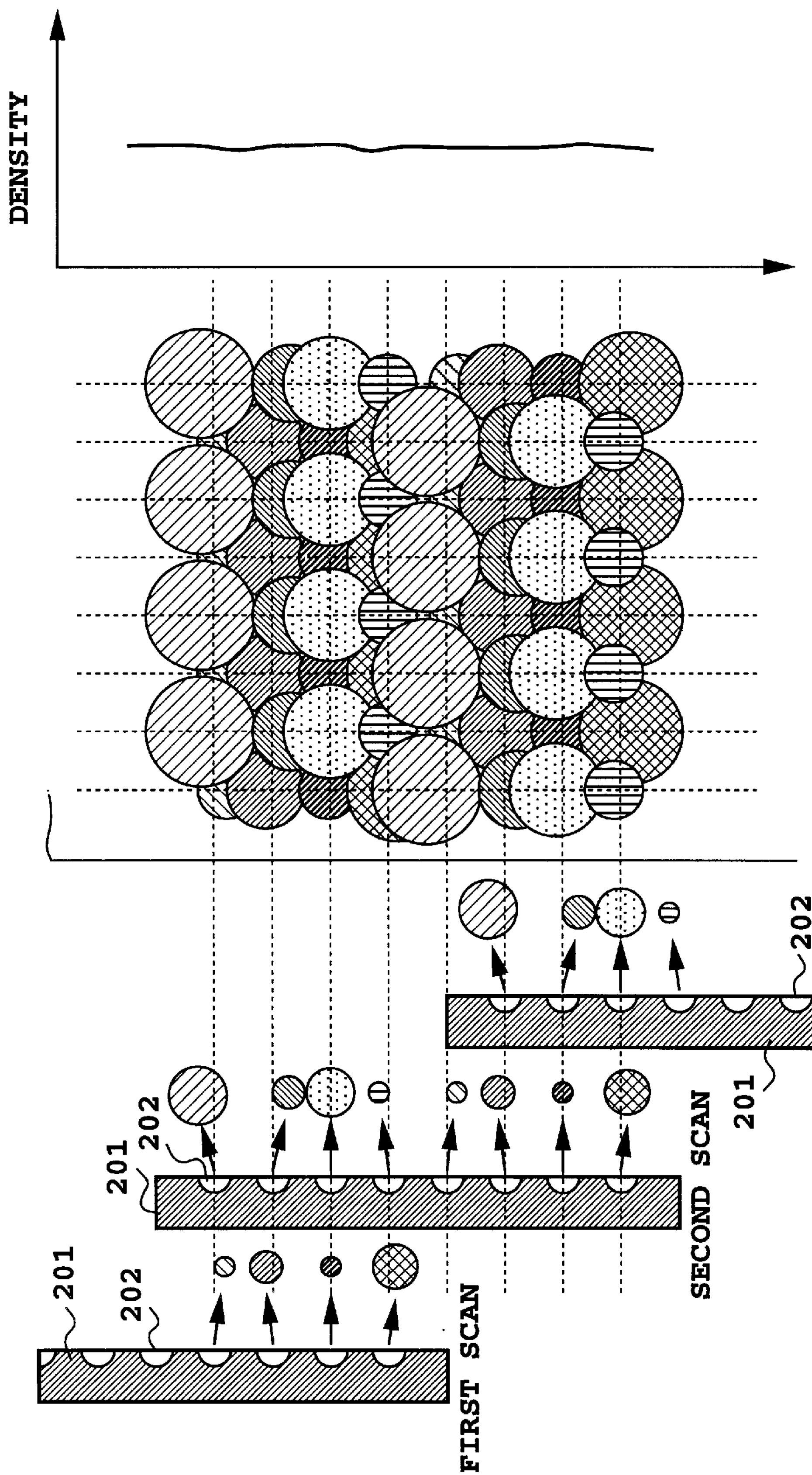
FIGS. 3A, 3B and 3C are schematic views for explaining printing with suppressed unevenness of density by a prior art example of multi-scan method.
Figure 4A:
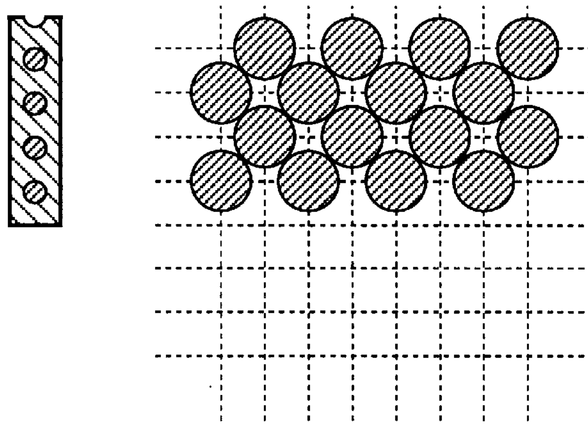
FIGS. 4A, 4B and 4C are schematic views for explaining divided printing in the multi-scan method.
Figure 4B:
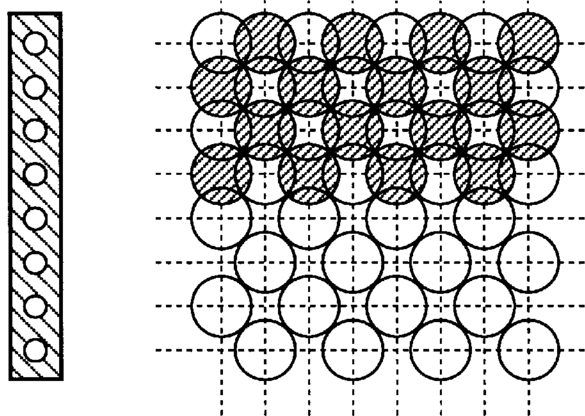
Figure 4C:
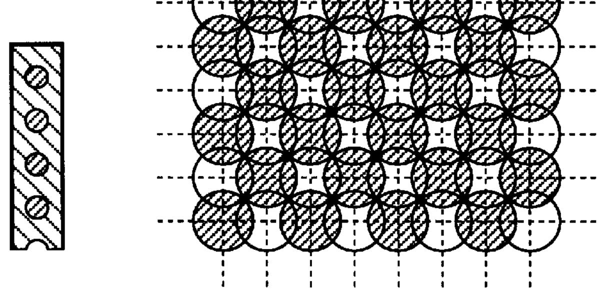
Figure 5:
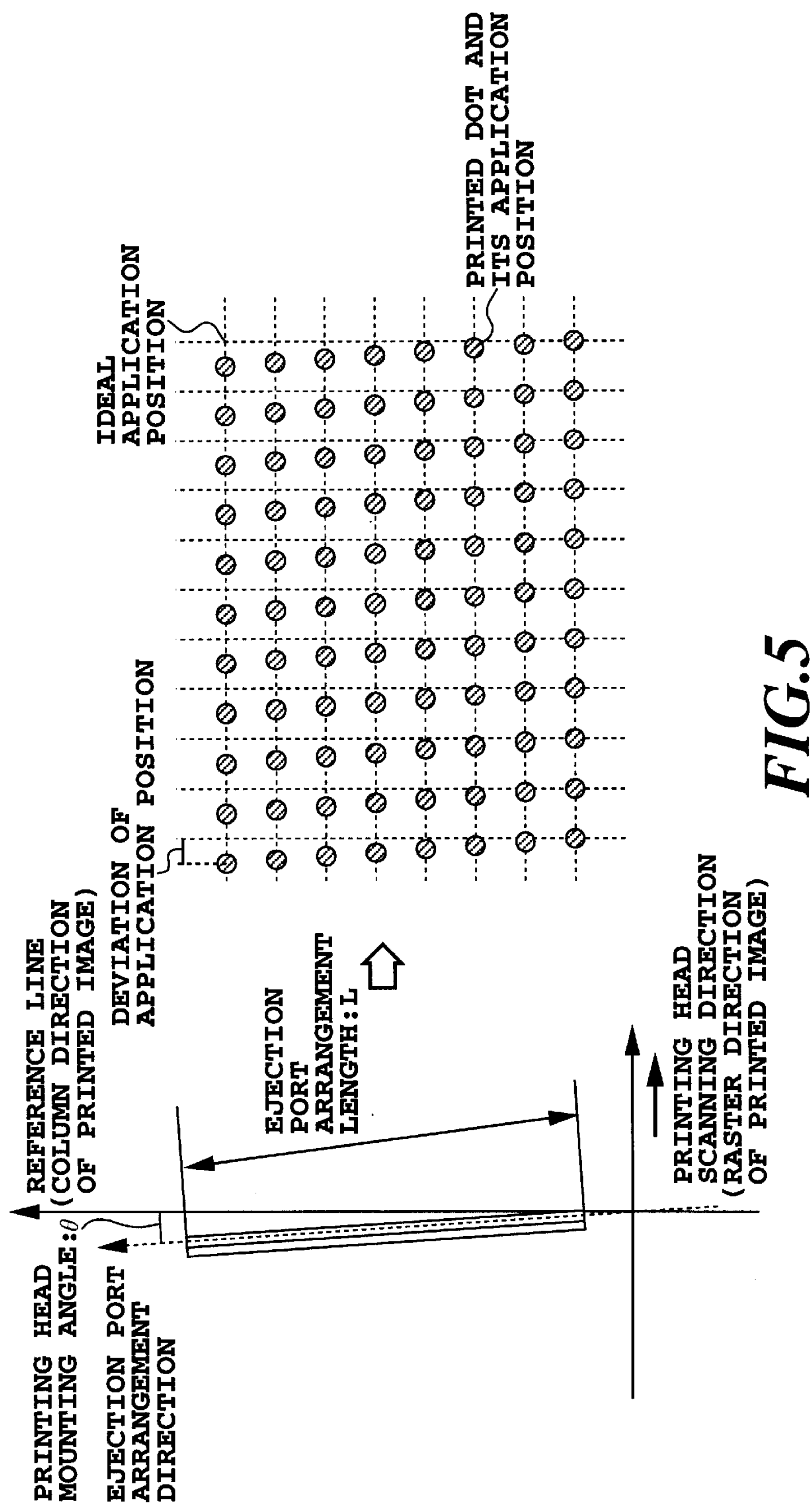
Figure 6:
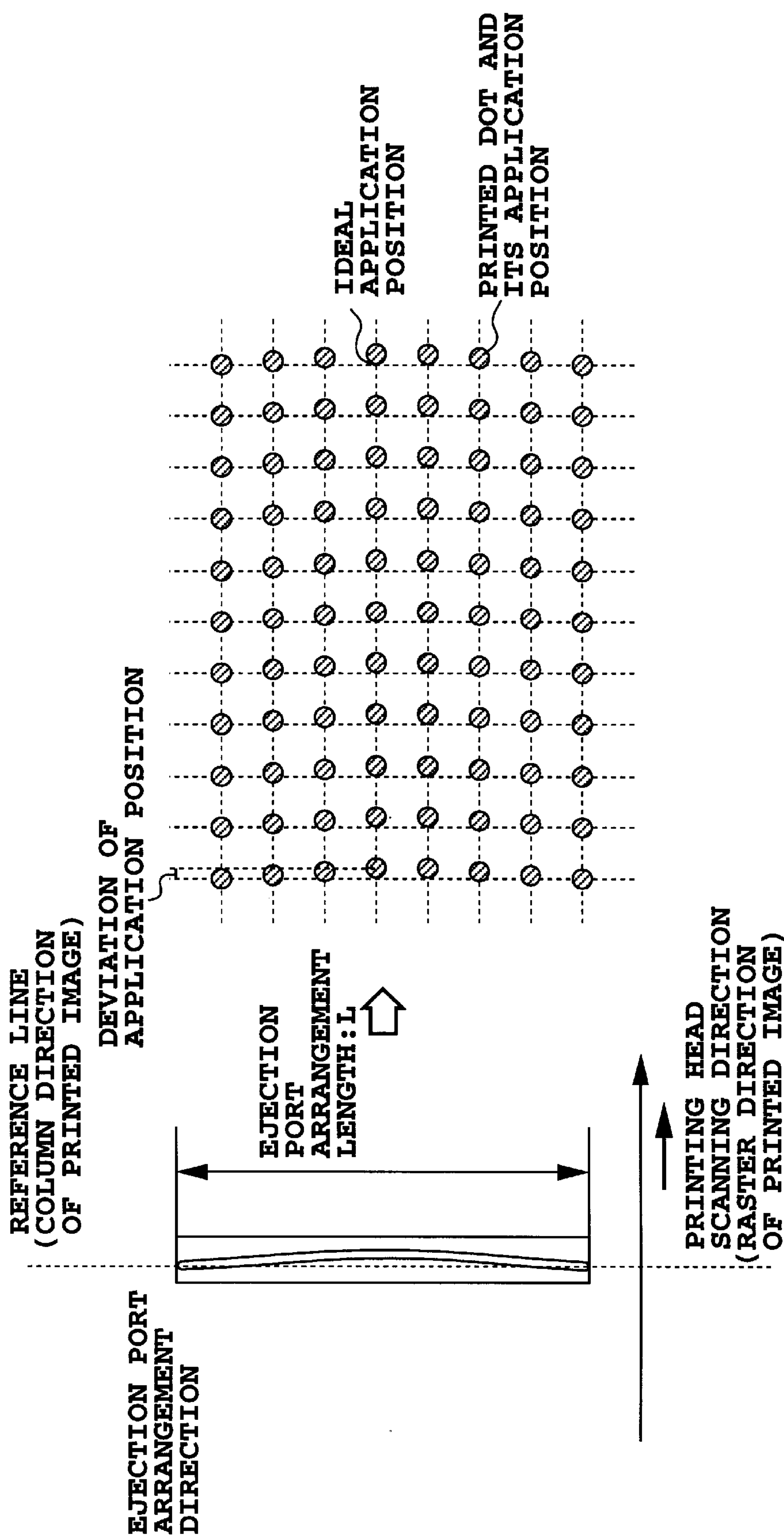
FIG. 6 is a schematic view for explaining a case when printing with a printing head of curved ejection port arrangement.
Figure 7:
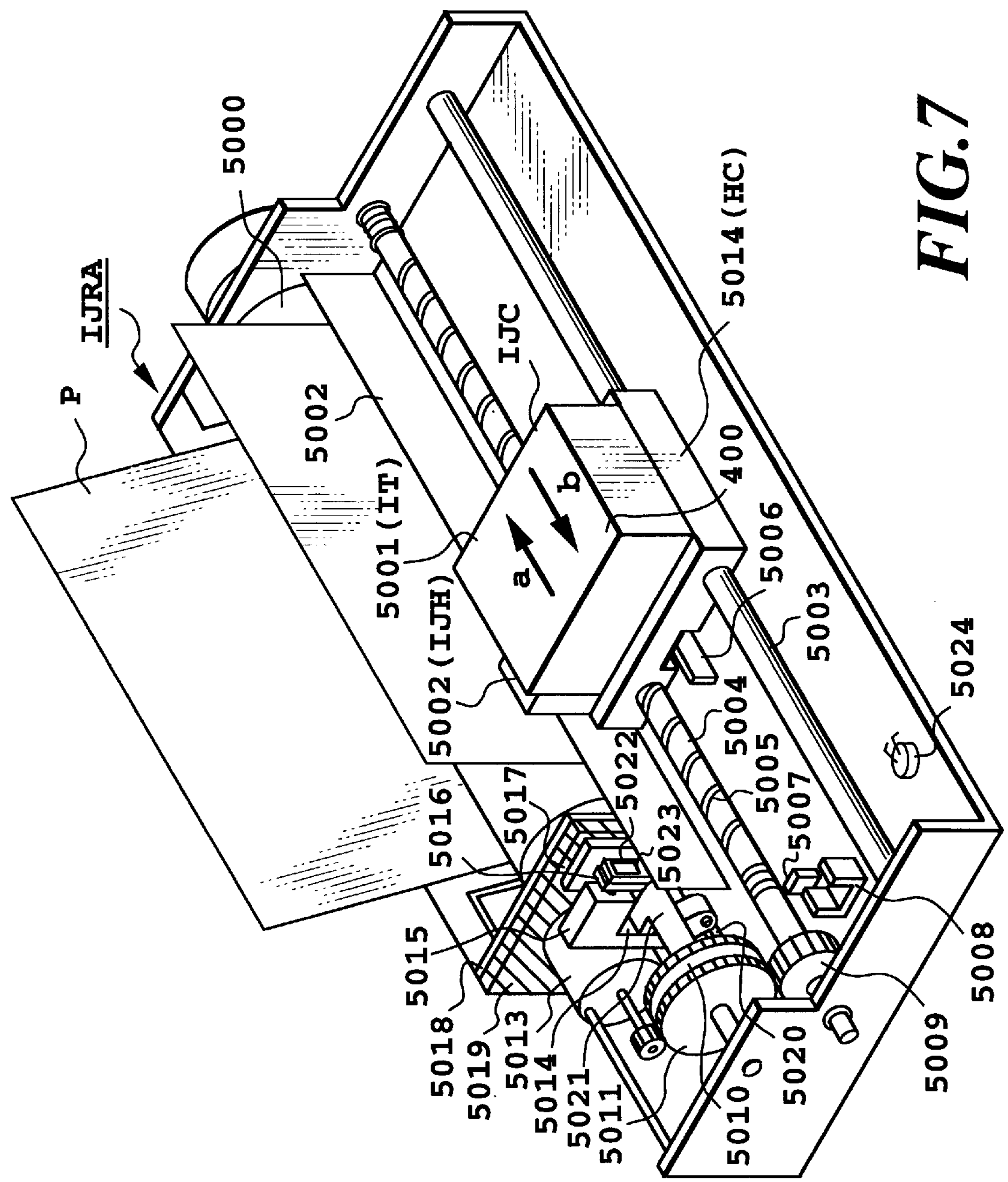
FIG. 7 is a perspective view schematically showing an example of ink jet printing apparatus main unit to which the present invention is applied.

FIG. 7 is a schematic view showing an example of the ink jet printing apparatus IJRA to which the present invention is applied. Referring to FIG. 7, a lead screw 5004 rotates according to forward and reverse rotations of a drive motor 5013 through driving force transmission gears 5011 and 5009. On the other hand, a spiral groove 5005 of the lead screw 5004 is engaged with a pin (not shown) provided on the carriage HC, whereby the carriage HC can be reciprocally moved in directions of the arrow a or b according to the rotation of the lead screw. The carriage HC is equipped with the ink jet cartridge IJC which discharges the ink for printing during the printing scan. A reference numeral 5002 indicates a paper holding plate which presses a printing paper as a printing medium against a platen 5000 along a carriage moving path. Reference numerals 5007 and 5008 are photosensors, which form home position detection means for confirming the presence of a carriage lever 5006 in this area to make switching of the rotational direction of the motor 5013 and the like. A reference numeral 5016 is a member for indicating a cap 5022 for capping a front surface of the printing head, 5015 is suction means for sucking inside the cap, which makes suction recovery of the printing head through an in-cap opening 5023. A reference numeral 5017 denotes a cleaning blade, and a reference numeral 5019 denotes a member for supporting the blade to be movable in the longitudinal direction. A member 5019 is supported on a main unit supporting plate 5018. It is needless to say that the a conventional cleaning blade can be applied as the blade rather than the configuration shown.

Further, a reference numeral 5024 denotes a temperature sensor, which is able to detect the temperature of the environment in which the ink jet printing apparatus is placed. Still further, it is also possible to estimate the temperature of the printing head based on the detected temperature. The temperature detection means may be mounted on the ink jet cartridge IJC, or directly to the ink jet unit IJU.

Yet further, a reference numeral 5021 denotes a lever for starting suction of suction recovery, which moves in association with movement of a cam 5020 which is engaged with the carriage, and the driving force from the drive motor is transmitted by conventional transmission means such as a clutch or the like to control the movement.

Yet further, these capping, cleaning, and suction recovery are arranged to be carried out when the carriage comes in the home position side area, to be predeterminedly carried out at the corresponding positions by the function of the lead screw 5005. However, a construction of any type can be applied to the present embodiment when the desired operations are arranged to be carried out at conventional timings known in the art.

As is seen from FIG. 7, the ink jet cartridge of the present embodiment has a large ink containing ratio, having a shape in which a tip of the ink jet unit IJU is slightly protruded from the front surface of the ink tank IT. The ink jet cartridge IJC is supported by a positioning means, which will be described later, and electrical contacts of the carriage HC which is mounted on the ink jet printing apparatus main unit IJRA, and detachable from the carriage HC.

(ii) Description of the ink jet unit IJU structure

The ink jet unit IJU is a unit of a type for printing by using an electro-thermal converter to generate heat energy for generating film boiling in the ink according to an electrical signal.

(iii) Description of the heater board

Figure 8:
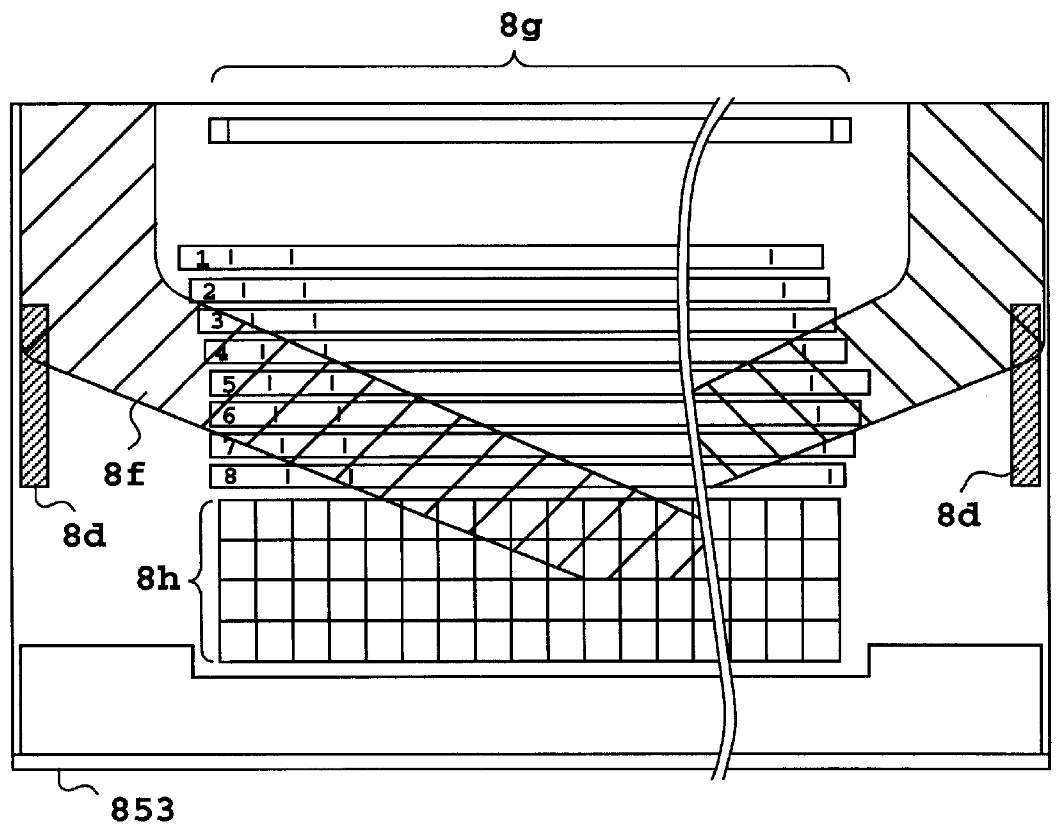
FIG. 8 is a schematic plan view showing a heater board forming a printing head used in the apparatus.

FIG. 8 is a schematic view showing a heater board 100 used in the present embodiment. Temperature-controlling (sub)heaters **8*d* comprising 64 ejection (main) heaters for ejecting the ink and drive elements 8*h* are formed in the positions as shown on the substrate. By arranging the individual elements on the same substrate, detection and control of the head temperature can be efficiently performed, the head can be formed compact in size, and the production process can be simplified. In the figure, a position of an outer peripheral wall cross section 8*f* of a top plate (not shown) for separating an area where the heater board is filled with the ink and an area which is not filled with the ink is indicated by hatching. The heater array 8*g* side of the outer peripheral wall cross section 8***f* of the top plate functions as a common liquid chamber. Further, the top plate is provided with grooves corresponding to the heater arrays 8*g*, whereby liquid passages corresponding to the individual heaters 8*c* are formed.

(iv) Description of control mechanism

The control mechanism for carrying out printing control of the individual units of the above-described apparatus construction will be described with reference to the block diagram shown in FIG. 9. In the figure which shows the control circuit, a reference numeral 10 denotes an interface for communicating printing signals and the like with the host apparatus, a reference numeral 11 denotes an MPU, a reference numeral 12 denotes a program ROM which stores control programs executed by the MPU 11, and a reference numeral 13 denotes a dynamic RAM for storing various data (the above printing signals, printing data supplied to the head, and the like) which can also store the number of printing dots, the number of replacement times of the ink printing head and the like. A reference numeral 14 denotes a gate array for performing supply control of printing data to the printing head 18, which also performs data transfer control among the interface 10, the MPU 11, and the RAM 13. A reference numeral 20 denotes a carrier motor as a drive source of movement for scanning of the printing head 18, and a reference numeral 19 denotes a transportation motor as a drive source for transporting the printing paper. A reference numeral 15 indicates a head driver for driving the head according to the printing data to eject the ink, and reference numerals 16 and 17 individually denote motor drivers for driving the transportation motor 19 and the carrier motor 20.

Figure 9:
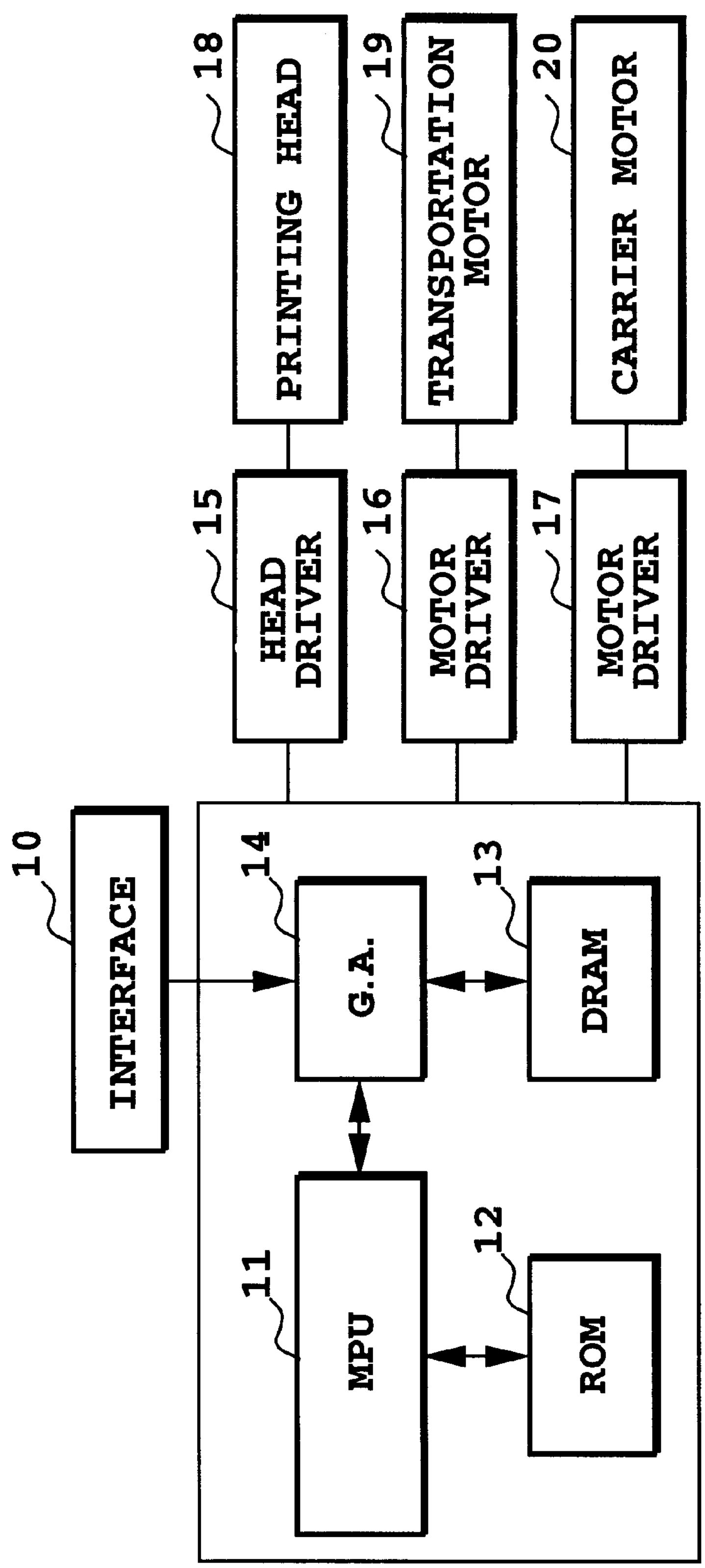
FIG. 9 is a block diagram showing control arrangement in the apparatus.
Figure 10:
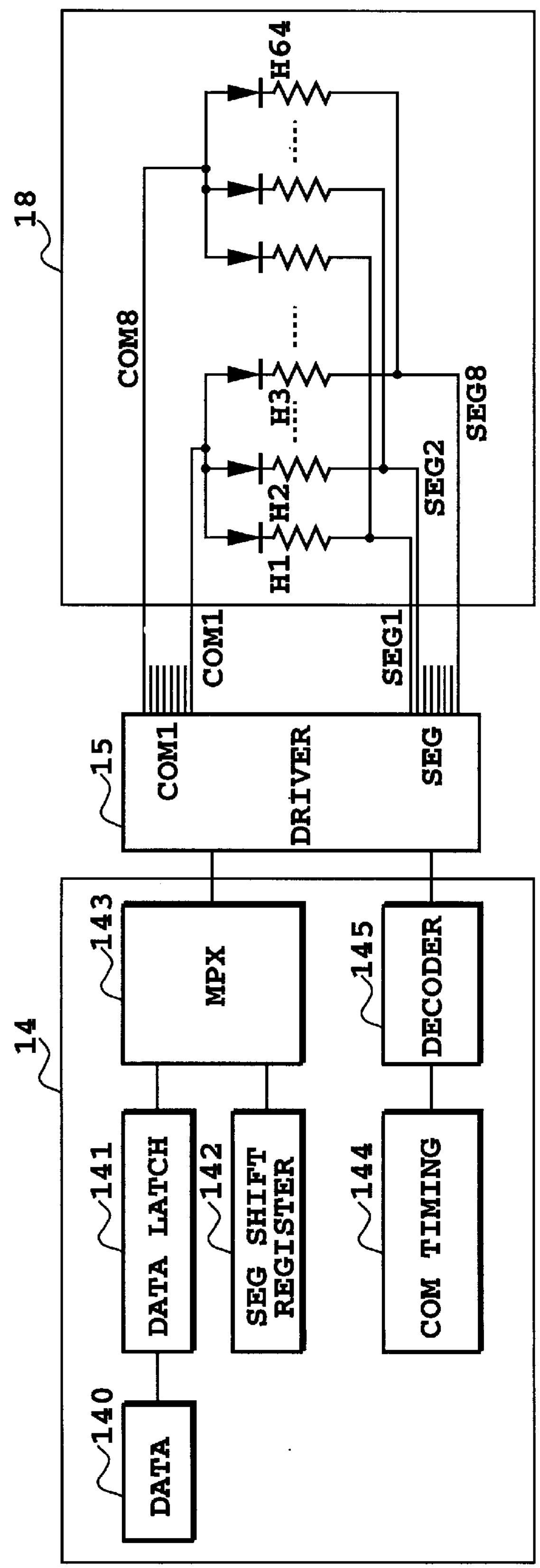
FIG. 10 is a block diagram showing details of a gate array and the like shown in FIG. 9.

FIG. 10 is a block diagram showing details of the gate array 14 and the like shown in FIG. 9. The gate array 14 has a data latch 141, a segment (SEG) shift register 142, a multiplexer (MPX) 143, a common (COM) timing generation circuit 144, and a decoder 145. In the printing head 18, a diode matrix structure is employed to drive 64 ejection heaters H1 to H64 forming the heater arrays 8*g* shown in FIG. 8, and each of 8 blocks is dividedly driven. The ejection heater, at which the common signal COM and the segment signal SEG are both active, is energized by a drive current to heat the ink so as to be ejected.

The decoder 145 decodes timing generated by a common timing generation circuit 144 to produce a signal for selecting one of the common signals COM 1 to 8. A data latch 141 latches printing data 140, which is read from the RAM 13 (see FIG. 9) and processed as will be described later in FIG. 12, in units of 8 bits, whereas the multiplexer 143 outputs the latched printing data as segment signals SEG 1 to 8 according to the segment shift register 142. The output from the multiplexer 143, as will be described later, can be varied according to the contents of the shift register 142, as in units of 1 bit, 2 bits, or all of 8 bits.

In operation of the above control arrangement shown in FIG. 9 and FIG. 10, when the printing signal is inputted in the interface 10, a processing for converting the printing signal to printing data is performed between the gate array 14 and the MPU 11. Then, drive of the motors 18 and 20 is controlled through the motor drivers 16 and 17, the printing head 18 is driven according to the printing data transmitted to the head driver 15 to carry out printing operation. The present embodiment describes a case where the printing head using 64 heaters is driven, however, the number of the ejection heaters is not limited to this, but any number can make drive control with similar construction.

Figure 11:
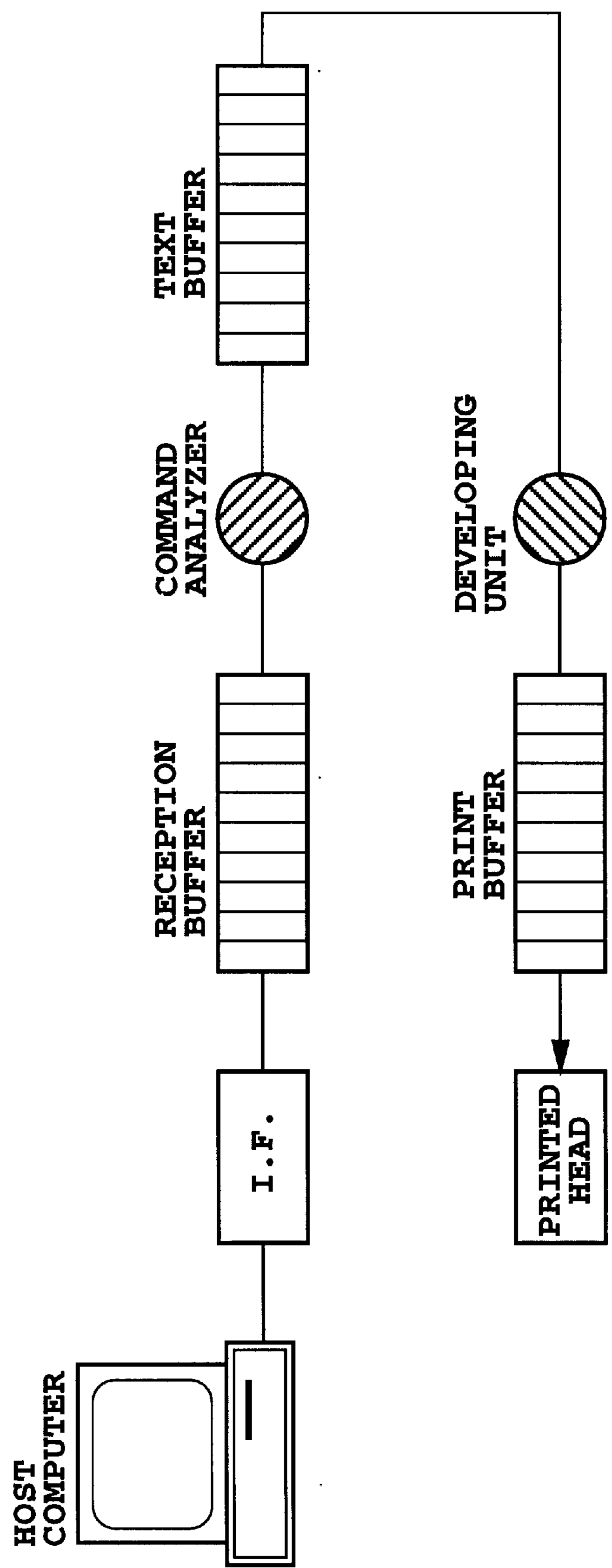
FIG. 11 is a schematic view showing printing data flow in the apparatus.

FIG. 11 is a schematic view for explaining printing data flow within the printing apparatus according to the present embodiment, in which each buffer is formed in the DRAM (see FIG. 9).

The printing data from the host computer is sent via the interface to a reception buffer and stored therein. The reception buffer has a capacity of several k bytes to several tens of k bytes. The printing data stored in the reception buffer is subject to a command analysis and then sent to a text buffer. In the text buffer, the printing data is held as an intermediate form of one line, and a processing is performed to add printing positions of individual characters, types of modification, sizes, characters (codes), font addresses, and the like. The capacity of the text buffer depends on the machine type, a capacity of several lines for a serial printer, and a capacity of several lines for a page printer. Further, the printing data stored in the text buffer is developed and stored in a print buffer in the form of binary data, and finally sent as the printing data to the printing head to print. In the present embodiment, the binary data stored in the print buffer is processed for thinning by a specific rate using a thinning mask pattern, and the thinned signal is sent to the printing head. For this purpose, it is also possible to look the data stored in the print buffer and then set the mask pattern. Further, it is also possible to develop the printing data stored in the reception buffer simultaneously with the command analysis and write in the print buffer, without having the text buffer in place of the above construction.

Figure 12:
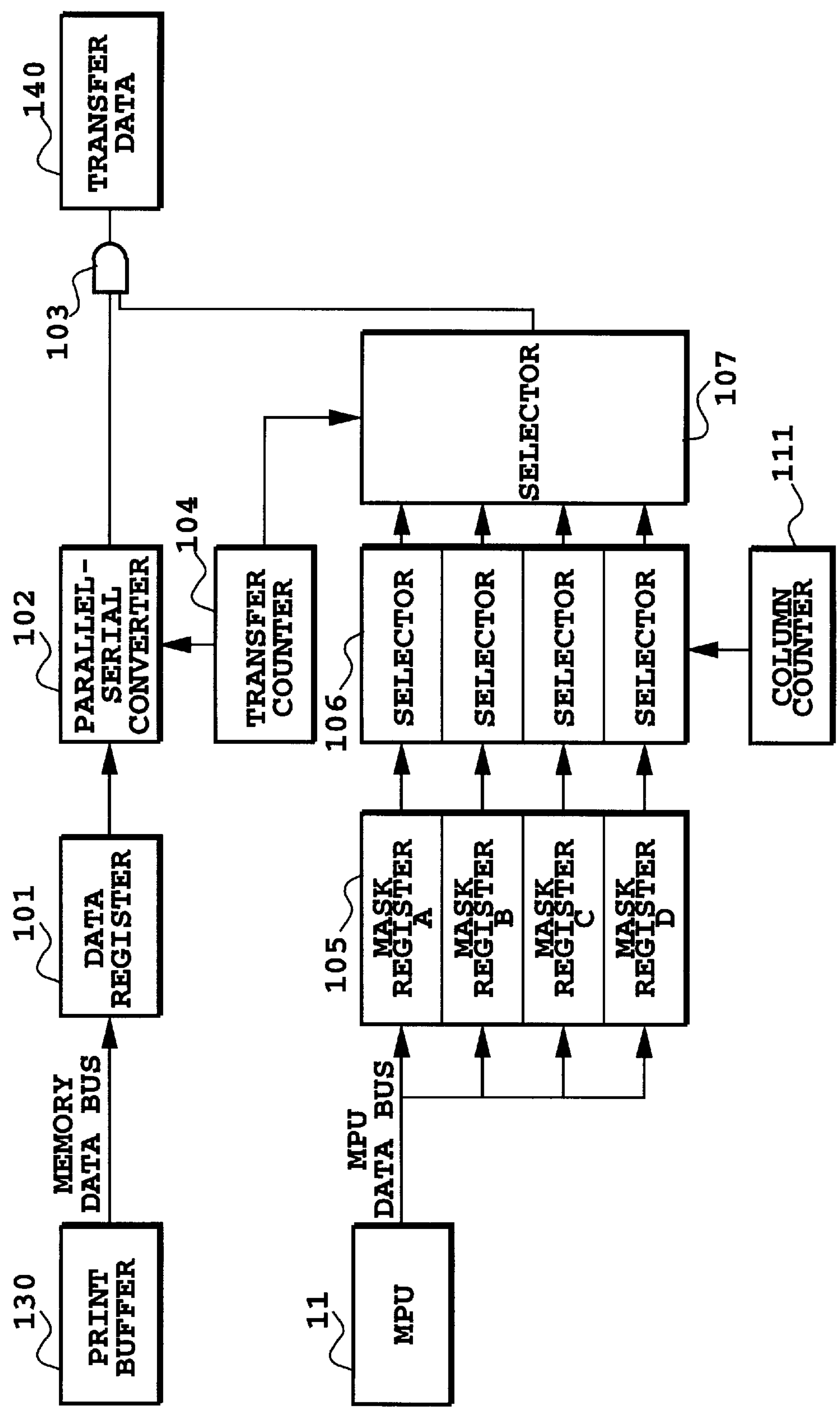
FIG. 12 is a block diagram showing a data transfer circuit formed in the gate array shown in FIG. 9.

FIG. 12 is a block diagram showing the structure for making printing of a multi-scan method in the above-described construction.

In the Figure, a reference numeral 101 denotes a data register, connected to a memory data bus, for reading and temporarily storing print data stored in a print buffer 130 in a memory 13, a reference numeral 102 denotes a parallel/serial converter for converting data stored in the data register 101 into serial data, a reference numeral 103 denotes an AND gate for masking the serial data, and a reference numeral 104 denotes a counter for controlling the number of data transfers.

A reference numeral 105 denotes a register connected to the MPU data bus for storing the mask pattern, a reference numeral 106 denotes a selector for selecting the column position of the mask pattern, a reference numeral 107 denotes a selector for selecting the line position of the mask pattern, a reference numeral 108 denotes a register connected to the MPU data bus for setting the expansion amount, a reference numeral 109 denotes a counter for counting the number of expansions, a reference numeral 110 denotes a comparator for comparing the value of the expansion amount register 108 with the value of the expansion counter 109, and a reference numeral 111 denotes a counter for controlling the column position.

The data transfer circuit shown in FIG. 12 serially transfers a 64-bit print data to the print head in response to a printing signal sent from the MPU 11. The print data stored in the print buffer of the memory is temporarily stored in the data register 101 and converted into serial data by the parallel/serial converter 102. The converted serial data is masked by the AND gate 103, and then transferred to the print head. The transfer counter 104 counts the number of transferred bits and, when 64 is reached, ends the data transfer.

The mask register 105 comprises four mask registers A, B, C, and D, which stores mask patterns written by the CPU. Each register stores a mask pattern of vertical 4 bits× horizontal 4 bits. The selector 106 selects a mask pattern data corresponding to the column position using a value of the column counter as a selection signal. Further, the selector 107 selects a mask pattern data corresponding to the line position using the value of the transfer counter 104 as a selection signal. The transfer data is masked using the AND gate 103 by the mask pattern data selected by the selectors 106 and 107.

The present embodiment is described as a four-mask register construction, however, this may be another number of mask registers. Further, the masked transfer data is supplied directly to the printing head, which may alternatively be once stored in the print buffer.

An embodiment according to the present invention of the ink jet printing apparatus shown in FIGS. 7 to 12 will be described below.

(Embodiment 1)

As a first embodiment of the present invention, reducing unevenness of density in a printed image due to using an increased number of ejection ports for high-speed printing will be described below, in which a multi-scan method in which n times of scanning are performed for one scanning line (n being an integer of 2 or more) to make different ejection ports of the head correspond to the one scanning line and to complete printing on the one scanning line is employed and an amount of feeding the printing paper relatively to the head between respective two scannings in the n times of scannings is set to a value smaller than a value obtained by multiplying a total number of ejection ports by a ejection port pitch and dividing this product by 2(n−1).

Figure 13:
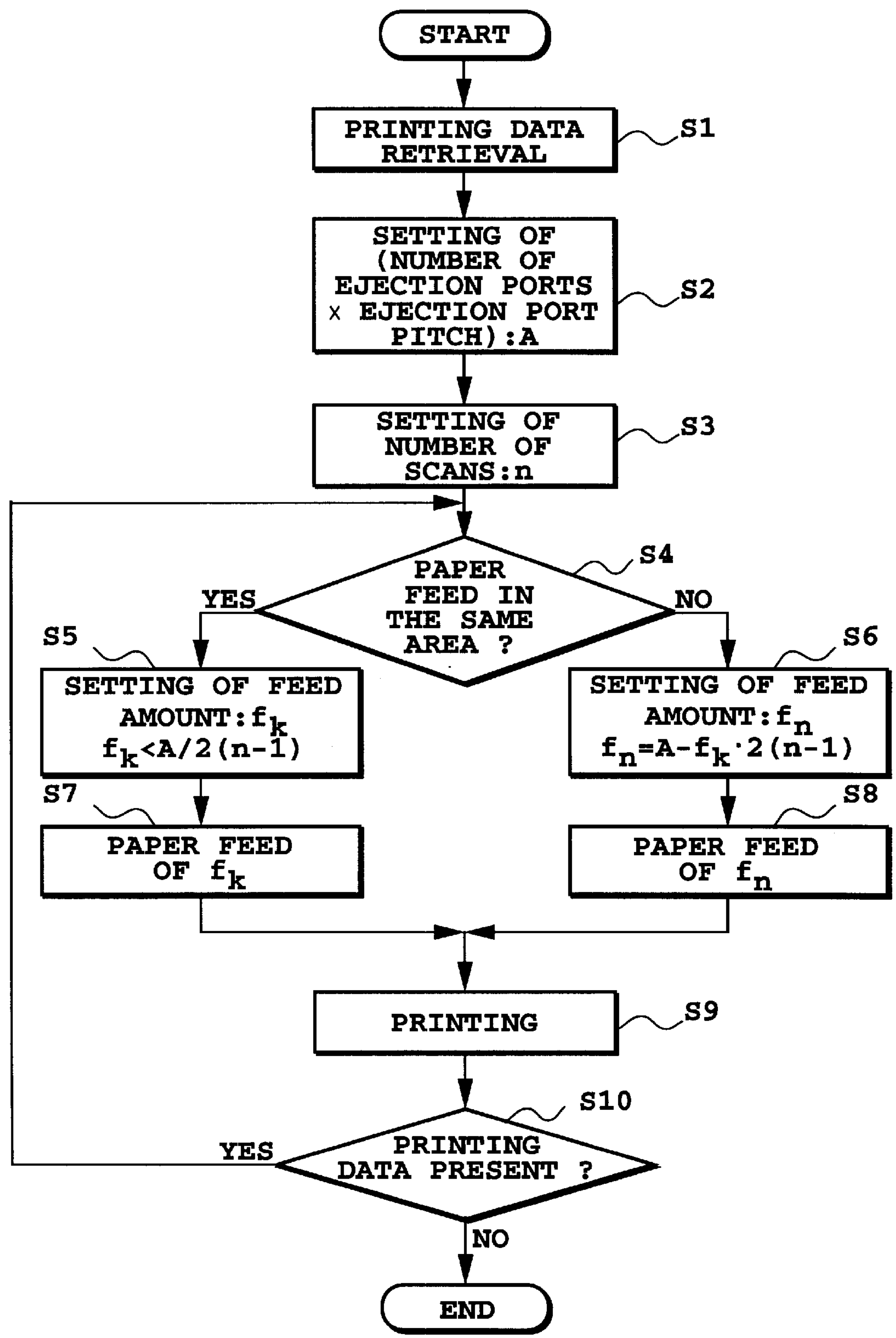
FIG. 13 is a flowchart showing printing operation according to a first embodiment of the present invention, especially a paper feed amount setting process.

Printing sequence including setting of the moving amount (feed amount) of the printing paper is shown in FIG. 13.

First, printing data is retrieved in step S1. Then, in step S2, a parameter A; a product of (a number of ejection ports of the printing head used for printing multiplied by an ejection port pitch of the printing head) is set. The parameter A may be previously set in a memory medium such as a ROM. Then, a type of the printing head mounted on the apparatus is detected, and the parameter A corresponding to the detected head can be read from the ROM to be set. If the printing head used is of a single type, the parameter A may be previously set independently from the present sequence. Next, in step S3, a parameter n; a number of scanning operations of the printing head is set. The number of scanning operations n with respect to one printing area to be printed by a plurality of scanning operations in the multi-scan method can be changed according to the type of the printing head used, a kind of data to be printed, or setting for a main unit of the printing apparatus, utility software used for the printing apparatus, or the like.

Next, in step S4, judgment is made as to whether a paper feed operation to be performed next is a paper feed to complete printing for the one printing area by a plurality of scans (herein after also referred as "a paper feed in the same area"), or is a paper feed to the next printing area. When it is judged that the paper feed operation is the paper feed in the same area, in step S5, the paper feed amount shown by a following expression is set. That is, the paper feed amount in the same area: $f_k$ is set to satisfy $$f_k < A/2(n-1), \text{ here k is an integer which satisfies a expression } 1 \leqq k \leqq n-1, \quad (1)$$

The paper head amount $f_k$ is previously stored in the memory medium according to the number of printing scans. It should be noted that this feed amount may be optionally set. A smaller value is effective for suppressing texture as far as the condition of the expression (1) is satisfied. Then, with the feed amount set, paper feed is made in next step S7 preparing for printing.

On the other hand, in step S4, when it is judged not to be the paper feed in the same area, in step S6, the feed amount is set as following expression. The feed amount in this case: $f_n$ is for paper feed to the next printing area and is set as $$f_n = A - f_k \cdot 2(n-1) \quad (2)$$

This feed amount may be previously stored in the memory medium, or be calculated from the value of $f_k$. Using the feed amount set in step S6, paper feed is made in step S8 preparing for printing.

Next, in step S9, printing is performed while scanning the printing head, when the scanning for the printing is completed, in step S10, judgment is made as to whether or not printing data to be printed is found. If the printing data is found, the processing is returned to step S4 and the above described processing is repeated. On the other hand if it is judged that no printing data is found, the present sequence is ended.

It should be noted that, in the present sequence, the feed amount in the same area may be variously set within the above stated condition. For example, the feed amount may be optionally set by the user, or may be set according to other factors such as environment temperature and the like. Further, it is also possible to change the feed amount depending on the number of printing scans, or set a plurality of feed amounts for a single number of printing scans n.

Figure 14:
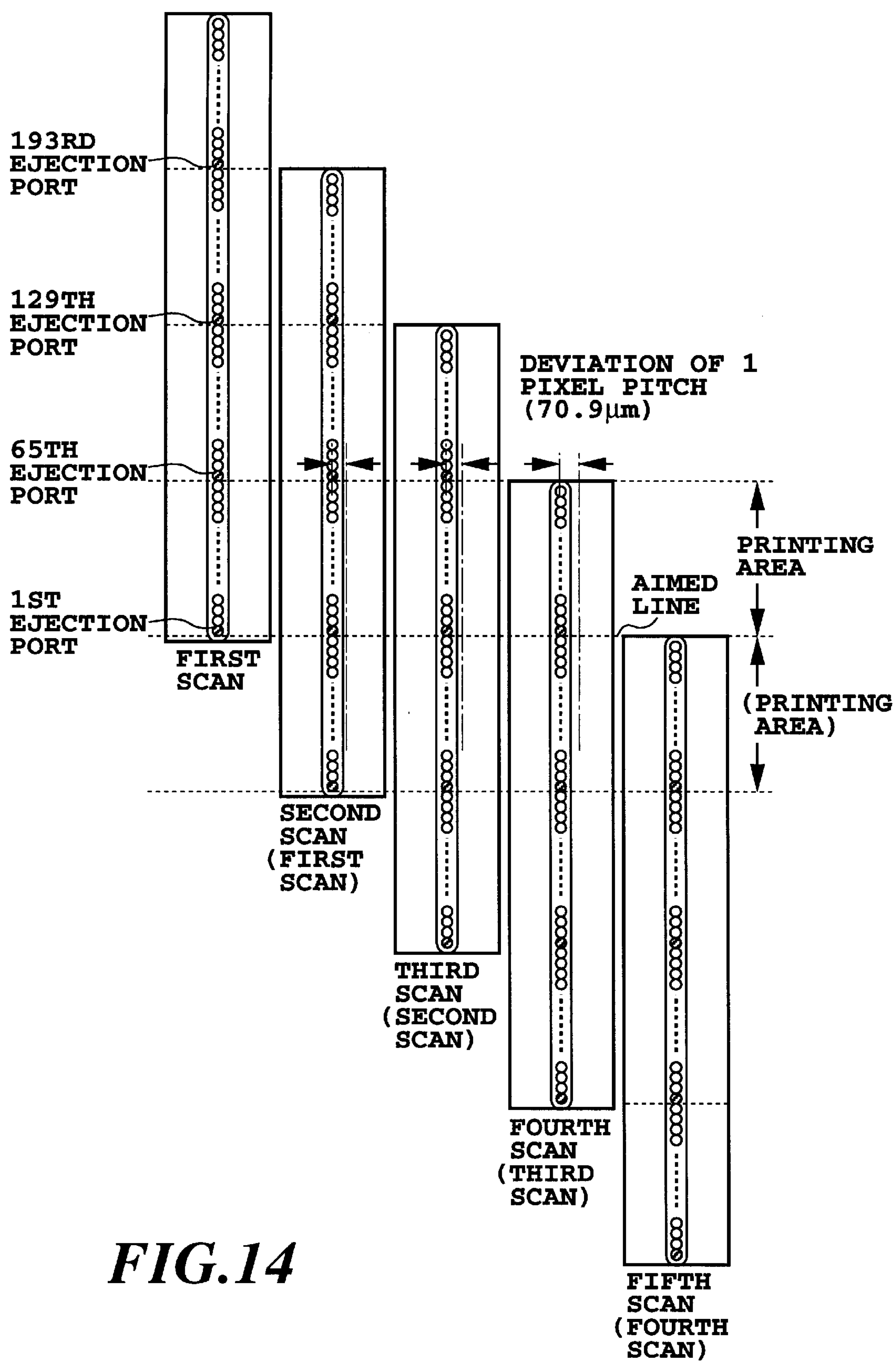
FIG. 14 is a schematic view for explaining an example of a prior art multi-scan method.

For comparison, a case where printing is made using a prior art multi-scan method will be described with reference to FIG. 14. FIG. 14 shows a case of performing 4-pass printing with use of the printing head having 256 ejection ports at a density of 360 dpi. More specifically, for the one printing area, first ejection port to the 64th ejection port are used in the first scan, the 65th ejection port to the 128 ejection port are used in the second scan, the 129th ejection port to 192 ejection port are used in the third scan, and the 193rd ejection port to 256th ejection port are used in the fourth scan, to perform printing while performing the paper feed of a length of 64 ejection port arrangement, that is a length of A/4. When the 4-pass printing is performed, combination of ejection ports used for printing corresponding lines each of which is located at the same position in the respective printing areas is always the same. For example, for an aimed line and corresponding lines in other printing areas in FIG. 14, the 1st, the 65th, the 129th, and the 193rd ejection ports are used.

In case that an ejection port array is inclined by 0.3° due to an error of head mounting angle and the like, with respect to the dot printed by the 1st ejection port, the deviation of dot position by the 65th ejection port is about 23.6 $\mu$m (=25.4 mm/360 dpi×64 ejection ports×sin 0.3°), the deviation of dot position by the 129th ejection port is about 47.2 $\mu$m (=25.4 mm/360 dpi×128 ejection ports×sin 0.3°), and the deviation of dot position by the 193rd ejection port is about 70.9 $\mu$m (25.4 mm/360 dpi×192 ejection ports×sin 0.3°). Thus, there is a deviation of 1 pixel pitch of 360 dpi between the dot by the 1st ejection port and the dot by the 193rd ejection port. A similar deviation occurs also in another line in the same printing area. That is, as shown in FIG. 14, in each printing area, dots printed by individual scans uniformly produce a constant deviation in the scanning direction and, as a result of this, a texture is generated according to a thinning pattern of the multi-scan method for determining arrangement of dots printed by individual scans.

Figure 15:
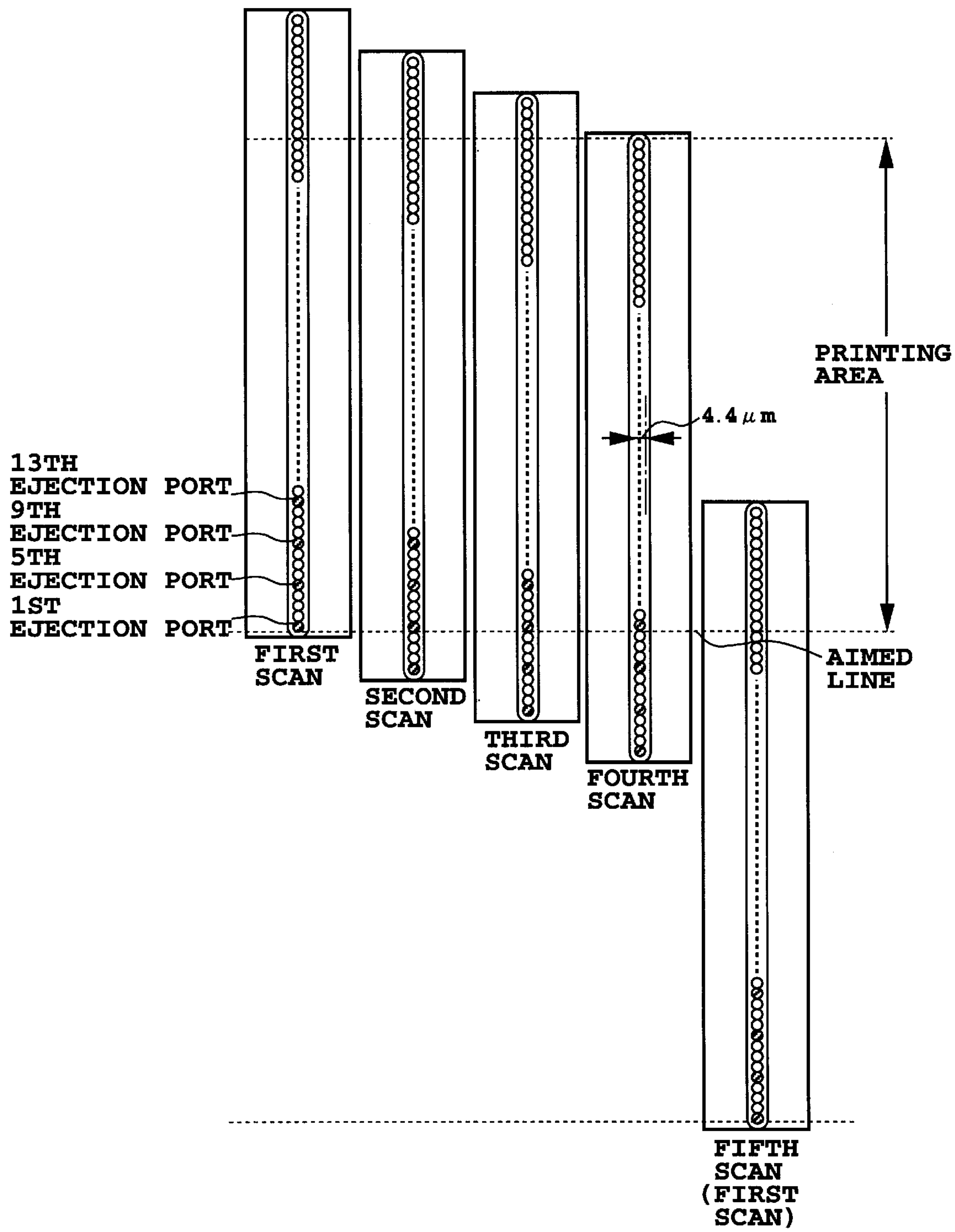
FIG. 15 is a schematic view for explaining the multi-scan method according to the first embodiment of the present invention.

Differing from the prior art example shown in FIG. 14, FIG. 15 shows a printing method to which the present invention is applied. FIG. 15 shows a case of performing 4-pass printing using the printing head having 256 ejection ports for comparison with the above prior art example. However, it is apparent from the foregoing description that the number of ejection ports is not substantially limitative of the present invention. In the present invention, according to the expression (1), the paper feed amount in the same printing area is less than a value by dividing the length of the number of ejection ports (number of ejection ports multiplied by (ejection port pitch) by 2(n−1). That is, the paper feed amount is less than the length of 256 ejection ports/2 (4−1)=the length of 42.7 ejection ports.

In the example shown in FIG. 15, the paper feed amount between individual scans in the same area is the length of 4 ejection ports, which satisfies the above condition. That is, as shown in FIG. 15, the paper feed of the length of 4 ejection ports is made between the first and second scans, between the second and third scans, and between the third and fourth scans.

As can be seen from the above discussion, in the present embodiment, setting of the paper feed amount in the same area is made under the condition for improving the application position accuracy more than two times with respect to accuracy of prior art so as to solve a problem caused by an application position error due to a length of an ejection ports arrangement and for enabling printing by the multi-scan method. More specifically, in the present embodiment, in the multi-scan method, to ensure an application position accuracy of at least two times the case of not applying the present invention, the paper feed amount is determined according to value obtained by dividing the length of ejection ports by 2×(n−1). However, of course, application of the present invention is not limited to this embodiment. For example, when improvement of the application position accuracy by two times is not necessarily required, the paper feed amount may be determined according to the value obtained by simply dividing the length of total ejection ports by n, as described later in a fourth embodiment.

On the other hand, the feed amount for moving to the next printing area is determined by the expression (2).

Length of 256 ports—4·2(4−1)=length of 232 ports. That is, this feed amount is set as the feed amount between the fourth scan and the fifth scan.

Similar to the example shown in FIG. 14, in case that the ejection port array is assumed to be inclined by 0.3° due to the error of the head mounting angle or the like, with respect to the dot printed by the 1st ejection port, deviation of the dot by the 5th ejection port is about 1.5 $\mu$m (=25.4 mm/360 dpi×4 ejection ports×sin 0.3°), the dot by the 9th ejection port has a deviation of about 3.0 $\mu$m (=25.4 mm/360 dpi×8 ejection ports×sin 0.3°), and the dot by the 13th ejection port has a deviation of about 4.4 $\mu$m (=25.4 mm/360 dpi×12 ejection ports×sin 0.3°).

These deviations are substantially small as compared with the case of the prior art example shown in FIG. 14, and is thus difficult to be perceived by human eyes. Therefore, texture due to the deviation is not generated or is nearly inconspicuous. It should be noted that, in the present embodiment, a case of 4 ejection ports is explained, but, similar effect can be obtained even with another feed amount if the above condition is satisfied. Regardless of this, a smaller feed amount in the same printing area is more effective for suppressing generation of texture.

Further, since a single line is printed using a plurality (four in this case) of different ejection ports, the effect for suppressing unevenness of density, which is inherent to the multi-scan method, due to deviation of ejection characteristics of the individual ejection port is not impaired.

As described above, by setting the feed amount of the printing medium between individual scans in the same area and the feed amount to the next printing area respectively according to the expressions (1) and (2), closer ejection ports in the arrangement can be used for the same line. This can reduce deviation amount of dot due to an error of the fabrication accuracy of the printing head, the mounting angle of the printing head, or the like, thereby realizing the multi-scan method that can suppress texture due to the deviation of dot position which may be generated in the prior art multi-scan method.

(Embodiment 2)

In the present embodiment, a multi-scan method will be described which is provided with an arrangement for suppressing generation of a bonding in a connection portion between individual printing areas, in addition to the arrangement described in the first embodiment.

More specifically, in the present embodiment, when performing printing on the printing medium on which the bonding between printing areas are relatively conspicuous, to suppress generation of the bonding as possible, printing is performed so that a last scan in printing for one printing area and the first scan in printing for the next printing area are the same to each other.

Figure 16:
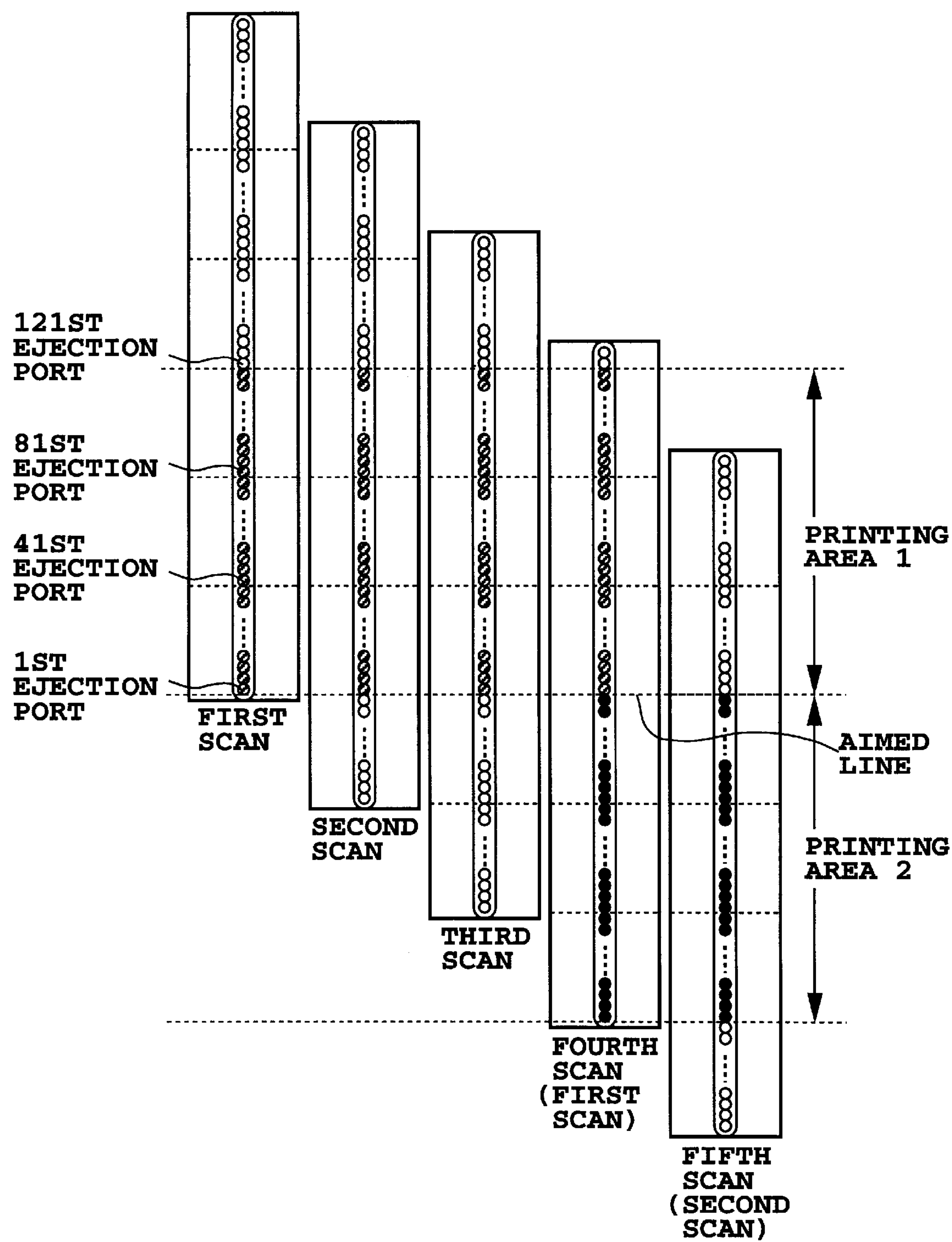
FIG. 16 is a schematic view for explaining the multi-scan method according to a second embodiment of the present invention.

FIG. 16 is an illustration for explaining a printing method according to the present embodiment, which shows a case of 4-pass printing using a printing head having 256 ejection ports. A paper feed amount between individual scans in the same area is set to a length of 40 ejection ports, and a feed amount to a next printing area is set to 0. More specifically, in FIG. 16, a 4th scan as the last scan of printing for the printing area 1 is the first scan on the next printing area 2. That is, in the 4th scan, a last printing for the printing area 1 is performed and, at the same time, a first printing as the 1st scan or the next printing area 2 is performed.

According to a condition discussed above, when, in the expression (2), the feed amount to the next printing area is 0, and the feed amount in the same area: $f_k$ is the length of 40 ejection ports, $$0=A-40\cdot 2(4-1)$$

$$A=240\times\text{ejection port pitch}$$

That is, in the present embodiment, of the printing head having 256 ejection ports, only 240 ejection ports are used, and the remnant 16 ports are not used.

In the 4th scan shown in FIG. 16, printing is made simultaneously on two printing areas. On the other hand, printing by the 1st scan to the 3rd scan, and printing by the 5th scan to the 7th scan are independently performed for individual printing areas. Therefore, at a connection portion of a printed image on the boundary of the individual printing areas, ink fixing state and the like differ due to a difference in printing time between individual printing areas and, as a result, a connected line, that is, banding tends to be generated at the connection portion. However, since, in the last 4th scan, the next printing area is also printed simultaneously, generation of the banding can be alleviated.

Explaining the alleviation of generation of the banding further in detail, when printing is made by the 4th scan, printing for the printing area 1 and printing of the printing area 2 are made simultaneously, and then printing for the printing area 2 is made in the state where printing for the printing area 1 is not completed. As a result of this generation of the banding is not induced. Further, in the 5th scan and after, since printing is made for the same printing area in the scan of immediately before, ink droplets applied to the connection portion are not attracted uniformly to the ink at the printing area 1 side, but attracted and dispersed also to the printing area 2 side. Therefore, even when density is partially increased due to ink attraction at the connection portion, it does not continue in scanning direction, thereby alleviating generation of banding.

Figure 17:
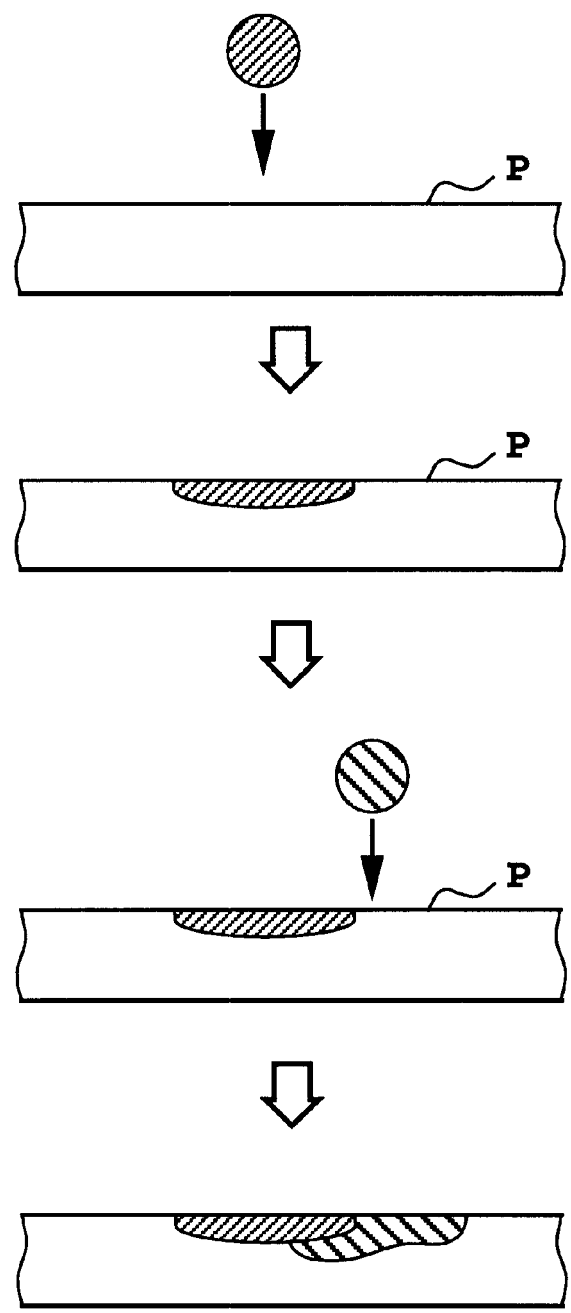
FIG. 17 is a sectional view schematically showing fixing of two ink droplets ejected successively.

With respect to generation of the banding, when the ink ejected after is overlapped on the ink ejected before in an adjacent printing area, in the overlapped portion, the after-ejected ink tends to sink in the thickness direction of the paper as compared with the before-ejected ink. FIG. 17 is a schematic sectional view showing this phenomenon. This phenomenon is considered to be caused due to following fact. Color materials such as dyestuffs in the ejected ink bond physically and chemically with the printing medium, and this bonding of the printing medium with the color materials is finite, therefore, as far as there is not a substantial difference in bonding force by types of color materials, the bonding of the color materials of the before-ejected ink with the printing medium is remained in preference on the surface of the printing medium. On the other hand, color materials of the after-ejected ink less difficult to bond with the surface of the printing medium, thus soaking in the thickness direction of the paper to bond with the printing paper. Further, in consideration of the behavior of the ink with a fiber within the printing medium, the fiber once bonded with dyestuffs in the ink becomes strong in hydrophilicity as compared with unbonded state, Therefore, ink droplets applied adjacent to the strongly hydrophilic portion tend to be attracted in the direction to the portion applied with the before-applied ink.

Figure 18:
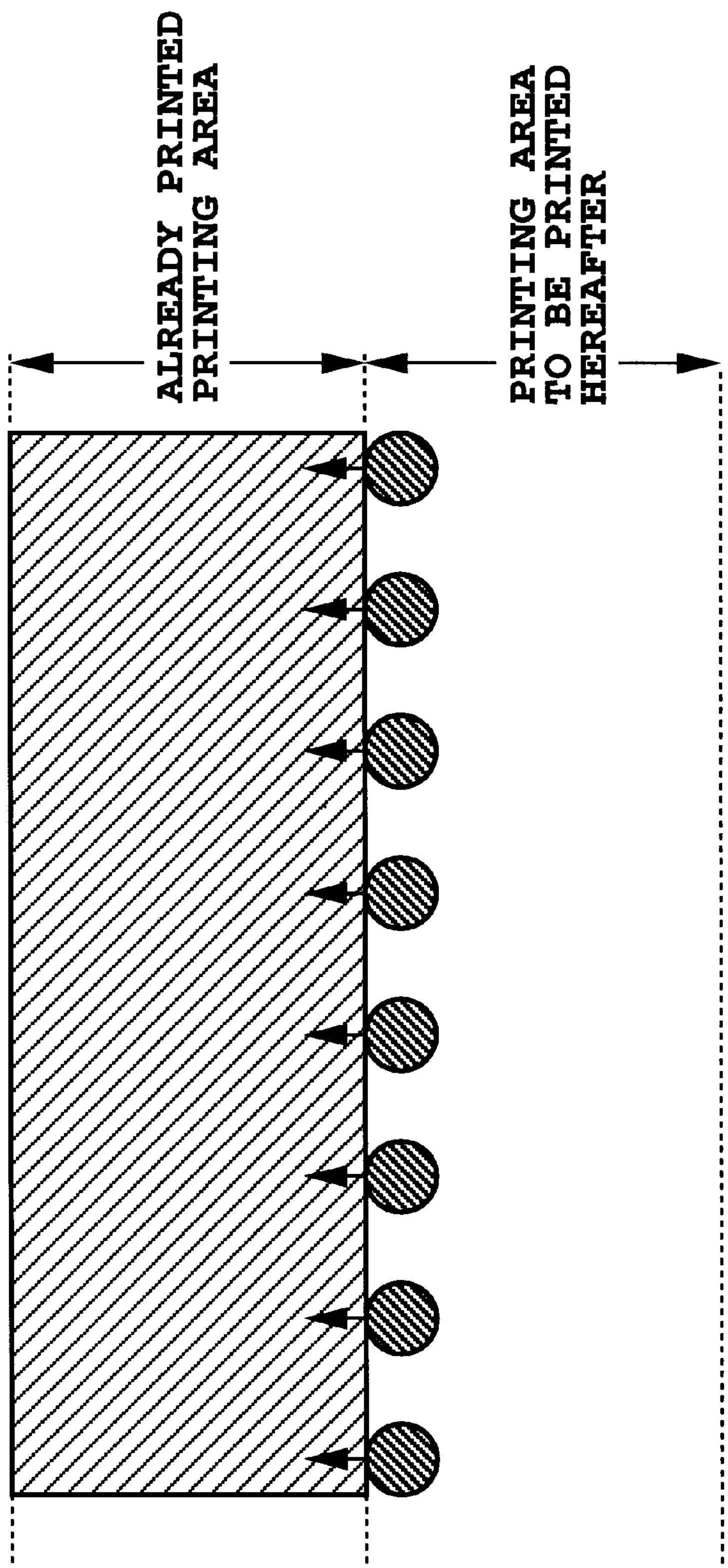
FIG. 18 is a schematic view for explaining generation of a bonding in a boundary of printing area.

Therefore, as shown in FIG. 18, when printing for the printing area adjacent to an already printed printing area is performed, the ink applied to the boundary of the area is attracted to the adjacent and already printed printing area. As a result, at the boundary of the already printed area, ink amount is partly increased, resulting in an increased density. If this occurs in part, it is not conspicuous. However, if the high-density portion continues in the scanning direction, it generates the bonding. Since the bonding is such a phenomenon, by the multi-scan method according to the present embodiment, the above-described generation of the bonding can be suppressed.

Further, in FIG. 16, considering the application position accuracy of the printed dot with an eye on a single line, when there is an inclination of 0.3° due to an error of mounting angle or the like, with respect to the dot printed by the 1st ejection port, deviation of application position of the dot by the 41st ejection port is about 15.1 μm (=25.4 mm/360 dpi×41 ejection ports×sin 0.3°), deviation of the dot by the 81st ejection port is about 29.6 μm (=25.4 mm/360 dpi×81 ejection ports×sin 0.3°), deviation of the dot by the 121st ejection port is about 44.7 μm (=25.4 mm/360 dpi×121 ejection ports×sin 0.3°), The deviation amount is about a half that of the case of the prior art example shown in FIG. 14, thereby suppressing generation of texture due to deviation of the application position.

As described above, the multi-scan method can be realized in which by making the last scan to a printing area and the first scan to the next printing area as the same, generation of the bonding between individual printing areas can be suppressed, and generation of texture caused by deviation of application position of the ink due to production accuracy of the printing head and mounting angle of the printing head and the like can be suppressed.

It should be noted that printing of the present embodiment can also be executed by a similar sequence shown in FIG. 13, and structure and processing for other control are the same as in the above embodiment 1. Then, detailed description there of is omitted here.

(Embodiment 3)

In the present embodiment, the multi-scan method is described which suppresses generation of the bonding in the connection portions between individual printing areas as in the above-described second embodiment.

Figure 19:
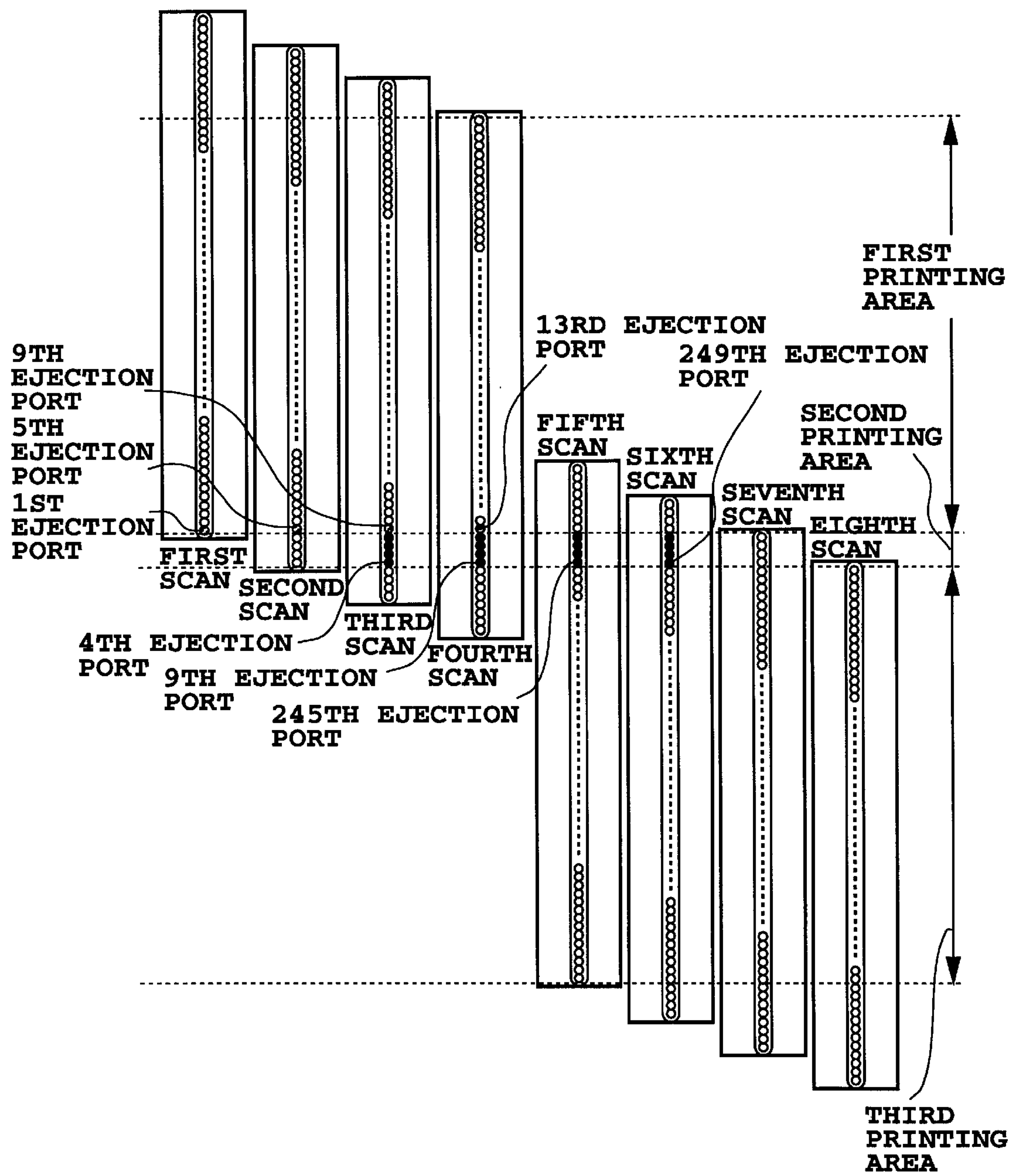
FIG. 19 is a schematic view for explaining the multi-scan method according to a third embodiment of the present invention.

FIG. 19 is an illustration for explaining a case of printing by the multi-scan method according to the present embodiment. In an example shown in the figure, the same feed amount is used as in the first embodiment shown in FIG. 15, and then in the same area, a paper feed of the length of 4 ejection ports is performed. However, in the present embodiment, a second printing area is provided as a connection portion, which has a width of the length of 4 ejection ports. Therefore, the feed amount between the 4th scan and the 5th scan is the value determined by adding the width of the connection portion: m; 4 ejection ports to a value of the expression (2). Therefore, in the present embodiment, the feeding amount to the next printing area is expressed by:

$$f_n = A - f_k \cdot 2(n-1) + m \tag{3}$$

In the first printing area, aiming at one line, the ejection port used for the line is a combination of the 1st, the 5th, the 9th, and the 13th ejection ports. The combination is quite the same as in the case of the first embodiment shown in FIG. 15. Also for the third printing area, quite the same can be said. This can suppress generation of texture due to deviation of application position of the ink.

In this case, the second printing area functions as a connection portion buffering area provided for preventing generation of the bonding between the first printing area and the third printing area. When aiming at a line, the ejection port used for the line is a combination of the 4th, the 9th, the 245th, and the 249th ejection ports. When it is assumed as inclined by 0.3° due to an error of mounting angle or the like, with respect to the dot printed by the 1th ejection port, deviation amount of application position by the 4th ejection port is about 1.5 μm (=25.4 mm/360 dpi×4 ejection ports×sin 0.3°), about 88.7 μm (=25.4 mm/360 dpi×240 ejection ports×sin 0.3°) by the 245th ejection port, and about 90.1 μm (=25.4 mm/360 dpi×244 ejection ports×sin 0.3°) by the 249th ejection port. Therefore, this case is liable to generate the texture due to deviation of application position of the ink. However, since the second printing area has a width of the length of 4 ejection ports (about a width of 0.28 mm for 360 dpi), even if a texture is generated, it is a very small portion that cannot be perceived by human eyes. Further, in the connection portion between the first printing area and the second printing area, printing is made same as in the prior art multi-scan method, the banding is not generated.

As described above, also in the present embodiment, the image quality has no problem, and generation of the bonding can be prevented by providing the connection portion buffering area as a part of the printing area and between individual printing areas.

Figure 20:
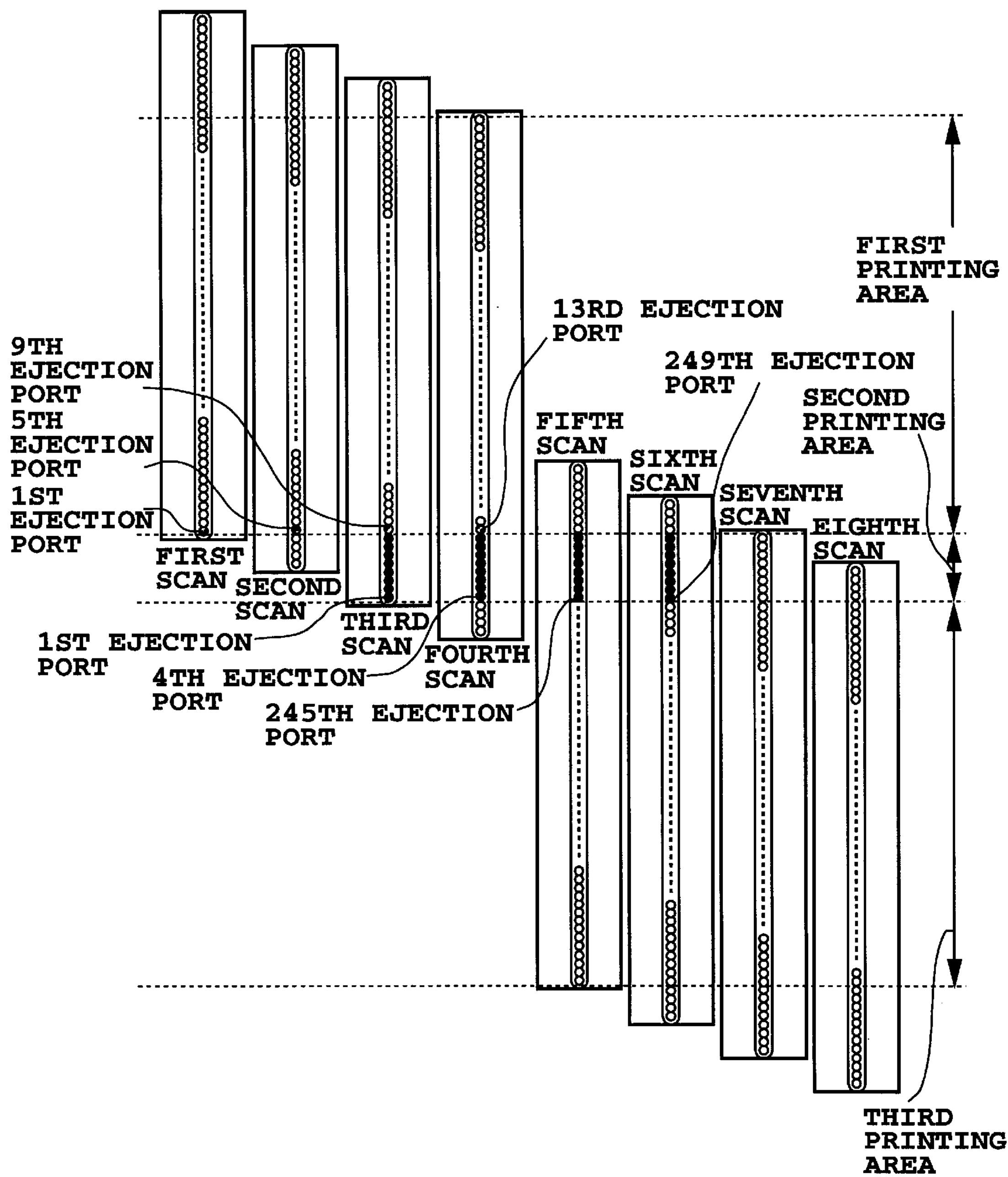
FIG. 20 is a schematic view for explaining the multi-scan method according to a modification of the third embodiment of the present invention.

A printing method shown in FIG. 20 is a modification example of the embodiment shown in FIG. 19, in which as in the above embodiment, printing is performed with a paper feed of the length of 4 ejection ports within the same first printing area, and the second printing area having a width of the length of 8 ejection ports as the connection portion. The combination of ejection ports used for the first printing area is quite the same as in the case shown in FIG. 19. A combination example of ejection ports used for the second printing area is the 1st, the 4th, the 245th, and the 249th ejection ports, which can be regarded as nearly equivalent to the case shown in FIG. 19. Therefore, generation of the banding can also be prevented by the multi-scan method shown in FIG. 20.

Figure 21:
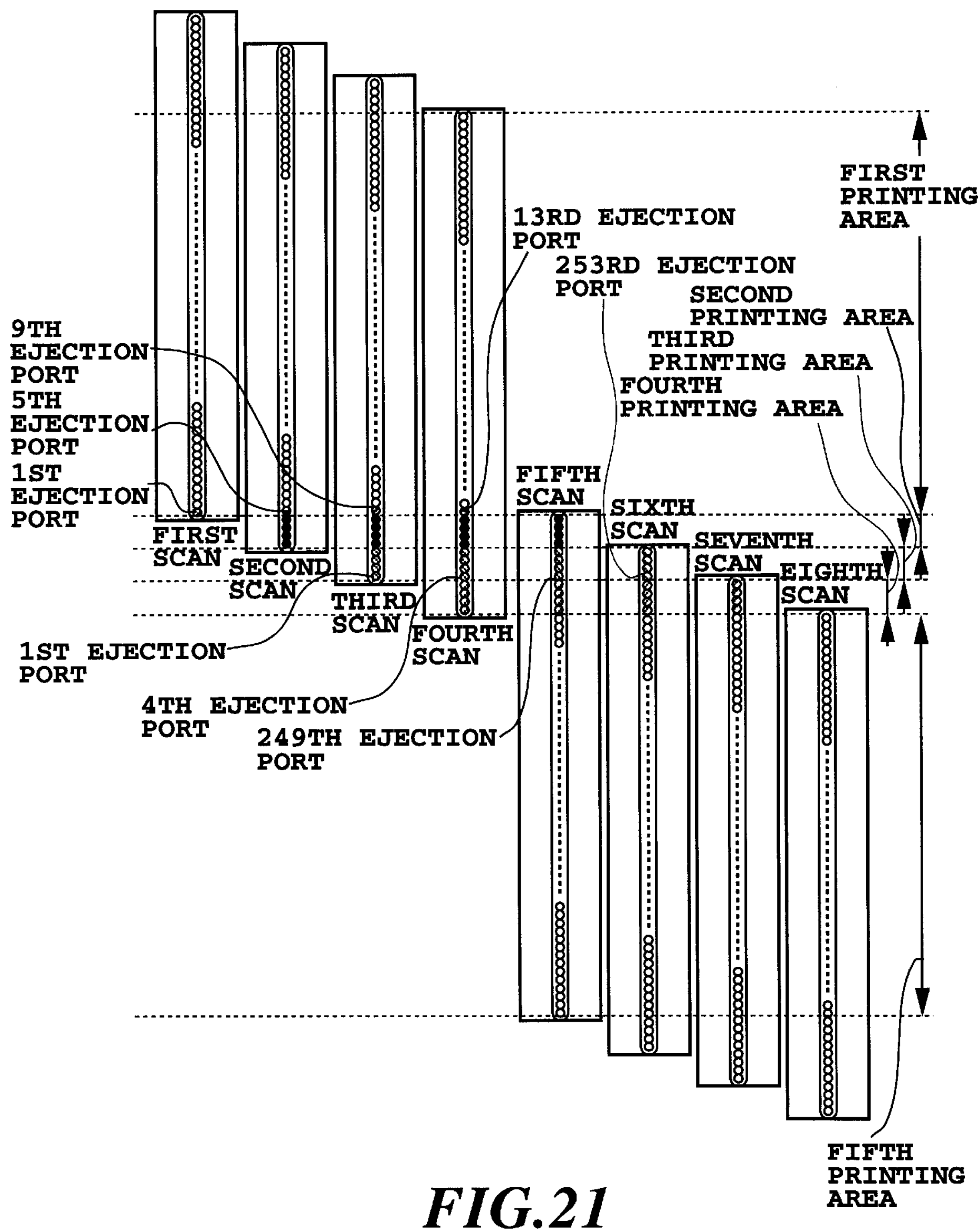
FIG. 21 is a schematic view for explaining the multi-scan method according to another modification of the third embodiment of the present invention.

Next, the multi-scan method shown in FIG. 21 is also similar to the above, in which printing is made with the paper feed amount of the length of 4 ejection ports in the same first printing area, and a second printing area, a third printing area, and a fourth printing area of a width of the length of 4 ejection ports are provided as connection portions. Also in this case, almost the same effect can be obtained as in the example shown in FIG. 19. Further, there is no unused ejection port in the individual scans, and the example is thus superior in ejection port use efficiency.

As described above, with the present embodiment, the multi-scan method can be realized in which the feed amount of the printing medium between individual scans in the same printing area, and the feed amount for moving to the next printing area are respectively set according to the expressions (1) and formula (3), and the connection portion buffering area is provided as part of printing area between individual printing areas to prevent generation of banding problem, and generation of a texture caused by deviation of application position due to an effect of production accuracy of the printing head and mounting angle of the printing head can be suppressed.

It should be noted that printing in accordance with the present embodiment as shown above can be executed by a similar sequence as shown in FIG. 13, and other control arrangement and processing are similar to those of the above-described embodiment 1, and therefor detailed description thereof is omitted here.

(Embodiment 4)

Figure 22:
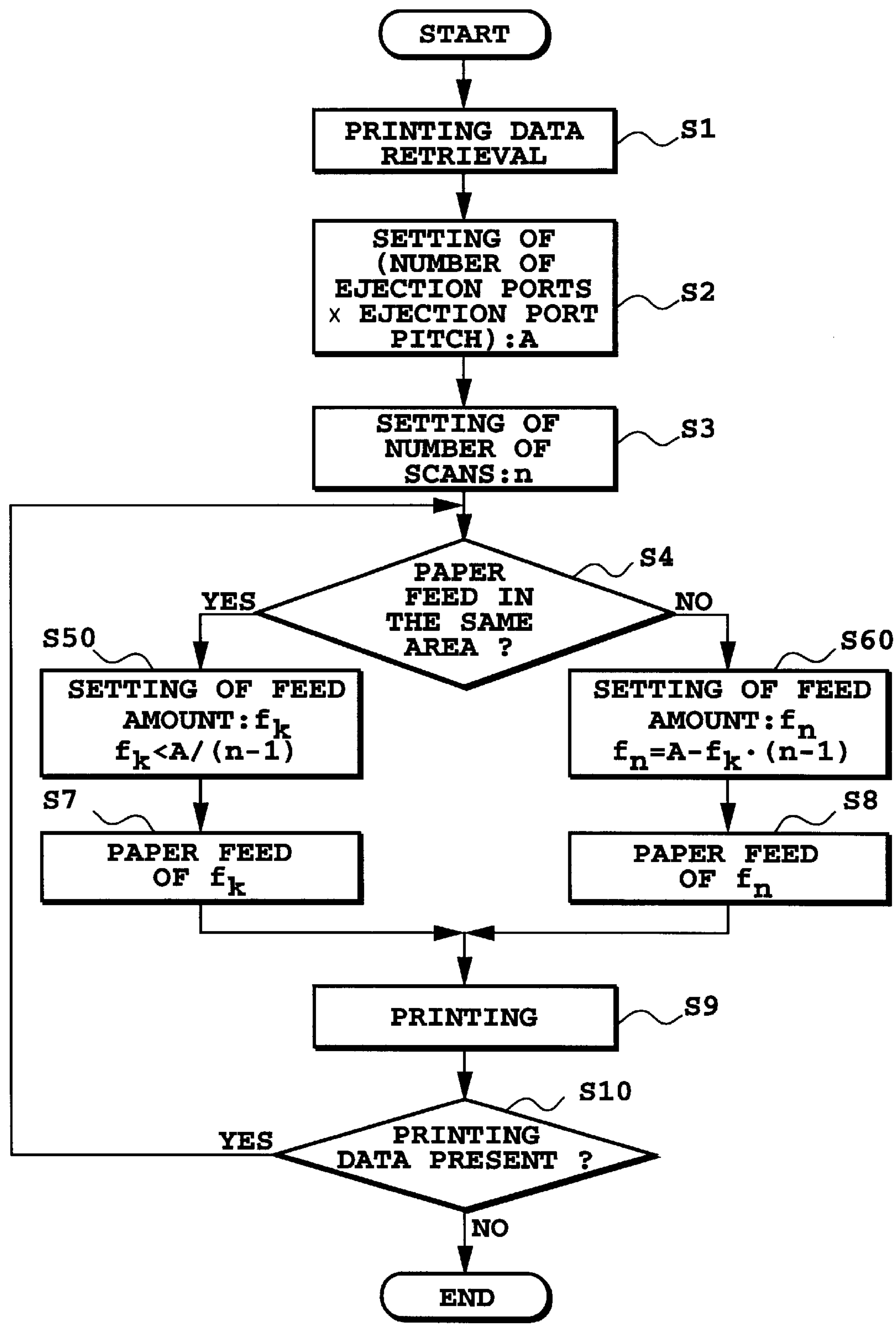
FIG. 22 is a flowchart showing printing operation according to a fourth embodiment of the present invention, especially a paper feed amount setting process.

In the above-described individual embodiments, the application position is improved by at least two times that of the case when the present invention is not applied. However, it is natural that the scope of the present invention is not limited to such arrangement. For example, when a curvature of the printing head is not so large, the paper feed amount $f_k$ in the same area may be set to satisfy an expression $f_k<A/n$. More specifically, by determining the paper feed amount within the range smaller than the paper feed amount A/n of the prior art example, the deviation can be corrected appropriately according to a degree of the printing head curvature and the like, and accompanies by this, the paper feed amount can be increased as large as possible within the above range to suppress degradation of printing speed as a whole. In this case, the paper feed amount to the next printing area is $f_n=A-f_k\cdot(n-1)$. FIG. 22 is a flowchart showing a setting process of the feed amount and shows a similar process as shown in FIG. 13. Apparently from above discussion, the process of FIG. 22 is different from that of FIG. 13 in that the feed amounts $f_k$ and $f_n$ are set to satisfy the expressions $f_k<A<n$ and $f_n=A-f_k(n-1)$, respectively in steps S50 and S60 of FIG. 22, respectively.

As described above, according to each embodiment of the present invention, since when printing an area of a predetermined size by n scans of the printing head and paper feed of the feed amount $f_k$ between the individual n scans, $f_k$ is set smaller than at least A/n (A being obtained by multiplying the number of ejection ports by the ejection port pitch), ejection ports closer in the ejection port arrangement can be used for the same line. This can reduce positional deviation between ejection ports forming the same line caused by errors such as production accuracy of the printing head and printing head mounting angle and the like.

As a result, the multi-scan method can be achieved which can suppress generation of the texture due to deviation of application position of the ink caused by errors in ejection port arrangement that could not be suppressed in the prior art multi-scan method.

What is claimed is:

1. An ink-jet printing apparatus constructed to use a printing head arranging a plurality of ejection ports for ejecting an ink to a printing medium to perform printing, comprising:

scanning means for scanning the printing head for printing in a scanning direction;

paper feed means for feeding the printing medium relative to the printing head in a feeding direction different from the scanning direction; and print control means for controlling said scanning means and said paper feed means to perform printing for a scan line by performing scanning a plurality of times so as to scan the different election ports to correspond to the scan line in a complementary manner, in which n (n being an integer of 2 or more) times of scanning of the printing head and (n−1) times of feeding of the printing medium, each of which is performed between respective said n times of scanning, are performed in order to perform printing for an area of a size corresponding to a predetermined number of scan lines, and a n-th feeding of the printing medium is performed in order to perform pringting of another area;

wherein a feed amount $f_k$ of each of said (n−1) times of feeding satisfies a following expression:

$$f_k<A/n$$

where k is an integer satisfying an expression: $1\leqq k\leqq n-1$, and A is obtained by multiplying a number of the plurality of ejection ports by an ejection port pitch.

2. An ink-jet printing apparatus as claimed in claim 1, wherein $f_k$ has a same value for each k and a feed amount $f_n$ of said n-th feeding satisfies an expression $f_n=A-f_k*(n-1)$.

3. An ink-jet printing apparatus as claimed in claim 1, wherein said $f_k$ also satisfies an expression: $f_k<A/2(n-1)$.

4. An ink-jet printing apparatus as claimed in claim 3, wherein $f_k$ has a same value for each k and a feed amount $f_n$ of said n-th feeding satisfies an expression $f_n=A-f_k*2(n-1)$.

5. An ink-jet printing apparatus as claimed in claim 3, wherein a feed amount $f_n$ of said n-th feeding satisfies an expression; $f_n=0$.

6. An ink-jet printing apparatus as claimed in claim 3, wherein $f_k$ has a same value for each k and a feed amount $f_n$ of said n-th feeding satisfies an expression $f_n=A-f_k*2(n-1)+m$, where m designates a width of a connection portion.

7. An ink-jet printing apparatus as claimed in claim 3, wherein the printing head utilizes a heat energy to produce a bubble in the ink for ejecting the ink by a pressure of said bubble.

8. An ink-jet printing method using a printing head arranging a plurality of ejection ports for ejecting an ink to a printing medium to perform printing, in which printing for a scan line is performed by performing scanning a plurality of times so as to scan the different election ports to correspond to the scan line in a complementary manner, said method comprising the steps of:

performing n (n being an integer of 2 or more) times of scanning of the printing head; and performing (n−1) times of feeding of the printing medium each of which is performed between respective said n times of scanning;

performing printing for an area of a size corresponding to a predetermined number of said lines together with said step for n times of scanning and said step for (n−1) times of feeding; and performing n-th feeding of the printing medium in order to perform printing of another area, wherein a feed amount $f_k$ of each of said (n−1) times of feeding satisfies a following expression;

$$f_k<A/n$$

where k is an integer satisfying an expression: $1 \leqq k \leqq n-1$, and A is obtained by multiplying a number of the plurality of ejection ports by an ejection port pitch.

9. An ink-jet printing method as claimed in claim 8, wherein $f_k$ has a same value for each k and a feed amount $f_n$ of said n-th feeding satisfies an expression $f_n = A - f_k * (n-1)$.

10. An ink-jet printing method as claimed in claim 8, wherein said $f_k$ also satisfies an expression $f_k < A/2(n-1)$.

11. An ink-jet printing method as claimed in claim 10, wherein $f_k$ has a same value for each k and a feed amount $f_n$ of said n-th feeding satisfies an expression $f = A - f_k * 2(n-1)$.

12. An ink-jet printing method as claimed in claim 10, wherein a feed amount $f_n$ of said n-th feeding satisfies an expression; $f_n = 0$.

13. An ink-jet printing method as claimed in claim 10, wherein $f_k$ has a same value for each k and a feed amount $f_n$ of said n-th feeding satisfies an expression $f_n = A - f_k * 2(n-1) + m$, where m designates a width of a connection portion.

14. An ink-jet printing method as claimed in claim 10, wherein the printing head utilizes a heat energy to produce a bubble in the ink for ejecting the ink by a pressure of said bubble.

* * * * *

UNITED STATES PATENT AND TRADEMARK OFFICE

CERTIFICATE OF CORRECTION

PATENT NO. : 6,007,181
DATED : December 28, 1999
INVENTOR(S) : Kiichiro Takahashi et al.

It is certified that error appears in the above-identified patent and that said Letters Patent is hereby corrected as shown below:

Sheet 14,
FIG. 14, "FIG. 14" should read -- FIG.14, PRIOR ART --.

Sheet 19,
FIG. 19, "13RD EJECTION PORT" should read -- 13th EJECTION PORT --.

Sheet 20,
FIG. 20, "13RD EJECTION PORT" should read -- 13th EJECTION PORT --.

Sheet 22,
FIG. 22, "$f_k < A/(n-1)$" should read -- $f_k < A/n$ --.

Column 1,
Line 8, "Oct. 30, "should read -- Oct. 30, 1996 and --.

Column 3,
Line 27, "of the of" should read -- of the --; and
Line 52, "a" should read -- an --.

Column 4,
Line 26, "complimentarily" should read -- complementarily --.

Column 5,
Line 2, "ink" should read -- an ink --.

Column 6,
Line 17, "the a" should read -- a --; and
Line 47, "is" should read -- are --.

Column 8,
Line 19, "look" should read -- look at --; and
Line 61, "stores" should read -- store --.

UNITED STATES PATENT AND TRADEMARK OFFICE
CERTIFICATE OF CORRECTION

PATENT NO. : 6,007,181
DATED : December 28, 1999
INVENTOR(S) : Kiichiro Takahashi et al.

It is certified that error appears in the above-identified patent and that said Letters Patent is hereby corrected as shown below:

Column 9,
Line 24, "a ejection" should read -- an ejection --.
Line 48, "(herein after" should read -- (hereinafter --; and "referred as" should Read -- referred to as --; and
Line 55, "a expression" should read -- an expression --.

Column 10,
Line 30, "192" should read -- 192nd --.

Column 11,
Line 1, "value by" should read -- value obtained by --;
Line 3, "(ejection" should read -- ejection --;

Column 12,
Line 9, "bonding" should read -- banding --.
Line 14, "bonding" should read -- banding -- and "are" should read -- is --;
Line 15, "as possible," should read -- as much as possible, -- and "bonding" should read -- banding --.
Line 49, "connected" should read -- connection -- and "banding" should read -- banding,--
Line 58, "this" should read -- this, --;

Column 13,
Line 7, "following" should read -- the following --;
Line 22, "state," should read -- state. --;
Line 34, "bonding" (both occurrences) should read -- banding --.
Line 37, "bonding" should read -- banding --;
Line 55, "bonding" should read -- banding --;
Line 63, "Then," should read -- Therefore, --;
Line 64, "there of" should read -- thereof --; and
Line 67, "bonding" should read -- banding --;

Column 14,
Line 13, "portion: m; 4 ejection ports" should read -- portion m (4 ejection ports) --;
Line 27, "bonding" should read -- banding --;
Line 45, "same" should read -- the same --; and
Line 48, "bonding" should read -- banding --;

UNITED STATES PATENT AND TRADEMARK OFFICE

CERTIFICATE OF CORRECTION

PATENT NO. : 6,007,181
DATED : December 28, 1999
INVENTOR(S) : Kiichiro Takahashi et al.

It is certified that error appears in the above-identified patent and that said Letters Patent is hereby corrected as shown below:

Column 16,
Line 9, "election" should read -- ejection --;
Line 18, "pringting" should read -- printing -- and "area;" should read -- area, --;
Line 31, ""expression:" should read -- expression --;
Line 37, "expression;" should read -- expression -.
Line 49, "election" should read -- ejection --; and
Line 65, "expression;" should read -- expression: --;

Column 18,
Line 3, "expression;" should read -- expression --.

Signed and Sealed this

Twelfth Day of February, 2002

*Attest:*

JAMES E. ROGAN

*Attesting Officer*

*Director of the United States Patent and Trademark Office*